(12) United States Patent
Kodama

(10) Patent No.: US 9,471,260 B2
(45) Date of Patent: Oct. 18, 2016

(54) PRINTING SYSTEM, PRINTING ASSISTANCE APPARATUS AND METHOD

(71) Applicant: CANON KABUSHIKI KAISHA, Tokyo (JP)

(72) Inventor: Yoichi Kodama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/698,181

(22) Filed: Apr. 28, 2015

(65) Prior Publication Data
US 2015/0324674 A1  Nov. 12, 2015

(30) Foreign Application Priority Data

May 8, 2014  (JP) ................. 2014-097112

(51) Int. Cl.
*G06K 15/00*  (2006.01)
*G06F 3/12*  (2006.01)

(52) U.S. Cl.
CPC ........... *G06F 3/1204* (2013.01); *G06F 3/1208* (2013.01); *G06F 3/1219* (2013.01); *G06F 3/1256* (2013.01); *G06F 3/1285* (2013.01); *G06K 15/005* (2013.01); *G06K 15/4065* (2013.01)

(58) Field of Classification Search
CPC .. G06F 3/1204; G06F 3/1208; G06F 3/1219; G06F 3/1256; G06F 3/1285; G06K 15/4065; G06K 15/005
USPC ................. 358/1.1, 1.12, 1.15, 1.18
See application file for complete search history.

(56) References Cited

U.S. PATENT DOCUMENTS

| 7,522,855 | B2 * | 4/2009 | Nakamichi | ........ G03G 15/5012 399/382 |
| 7,733,517 | B2 * | 6/2010 | Sato | ..................... G06F 17/211 358/1.12 |
| 7,768,667 | B2 | 8/2010 | Hino et al. | |
| 7,859,709 | B2 * | 12/2010 | Mori | ..................... G06F 17/211 358/1.13 |
| 7,995,219 | B2 * | 8/2011 | Nagatani | .................. G06T 3/40 358/1.1 |
| 8,780,393 | B2 | 7/2014 | Kodama et al. | |
| 8,991,807 | B2 * | 3/2015 | Konishi | ............... B65H 29/125 270/52.02 |
| 2006/0262347 | A1 * | 11/2006 | Ono | ..................... G06F 3/1205 358/1.15 |
| 2011/0228323 | A1 * | 9/2011 | Oshima | ................. G06F 3/1204 358/1.15 |

FOREIGN PATENT DOCUMENTS

| JP | 2006-301742 A | 11/2006 |
| JP | 2012-236322 A | 12/2012 |

* cited by examiner

*Primary Examiner* — Allen H Nguyen
(74) *Attorney, Agent, or Firm* — Fitzpatrick, Cella, Harper & Scinto

(57) ABSTRACT

An angle of rotation of a sheet is determined so as to match a processing area that is processed in a processing step defined by specification information with a processing area that is processed on the sheet placed in a placement direction designated in correspondence with a processing apparatus used in the processing step. After rotating the designated placement method by the determined angle of rotation, the resultant direction is printed in, for example, an area to be trimmed off as a placement direction of the sheet in the processing step.

13 Claims, 19 Drawing Sheets

FIG. 6D
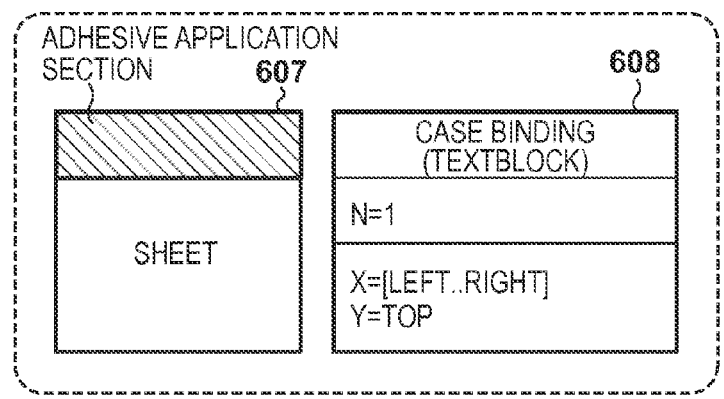
FIG. 6E
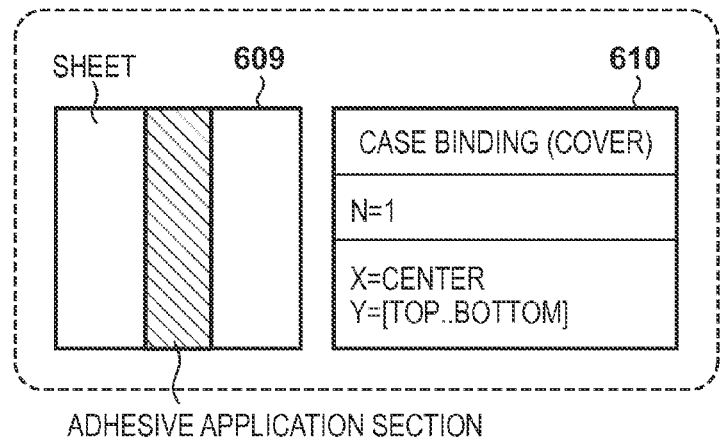
ADHESIVE APPLICATION SECTION
FIG. 6F
| OPERATION STEP NAME |
|---|
| NUMBER OF AREAS<br>N= |
| AREA 1<br>X=<br>Y= |
| AREA 2<br>X=<br>Y= |

FIG. 7

| MANUFACTURING APPARATUS | OPERATION STEP TYPE | PLACEMENT DIRECTION | PLACEMENT SIDE |
|---|---|---|---|
| TRIMMING DEVICE A | TRIMMING | ← | –(EITHER) |
| TRIMMING DEVICE B | TRIMMING | ↑ | –(EITHER) |
| TRIMMING DEVICE C | TRIMMING | ↓ | –(EITHER) |
| THREE-SIDE TRIMMING DEVICE A | THREE-SIDE TRIMMING | ← | FRONT |
| THREE-SIDE TRIMMING DEVICE B | THREE-SIDE TRIMMING | → | BACK |
| THREE-SIDE TRIMMING DEVICE C | THREE-SIDE TRIMMING | ↓ | FRONT |
| CASE BINDING DEVICE A | CASE BINDING | ← | BACK |
| CASE BINDING DEVICE B | CASE BINDING | ↑ | FRONT |
| CASE BINDING DEVICE C | CASE BINDING | ↓ | BACK |

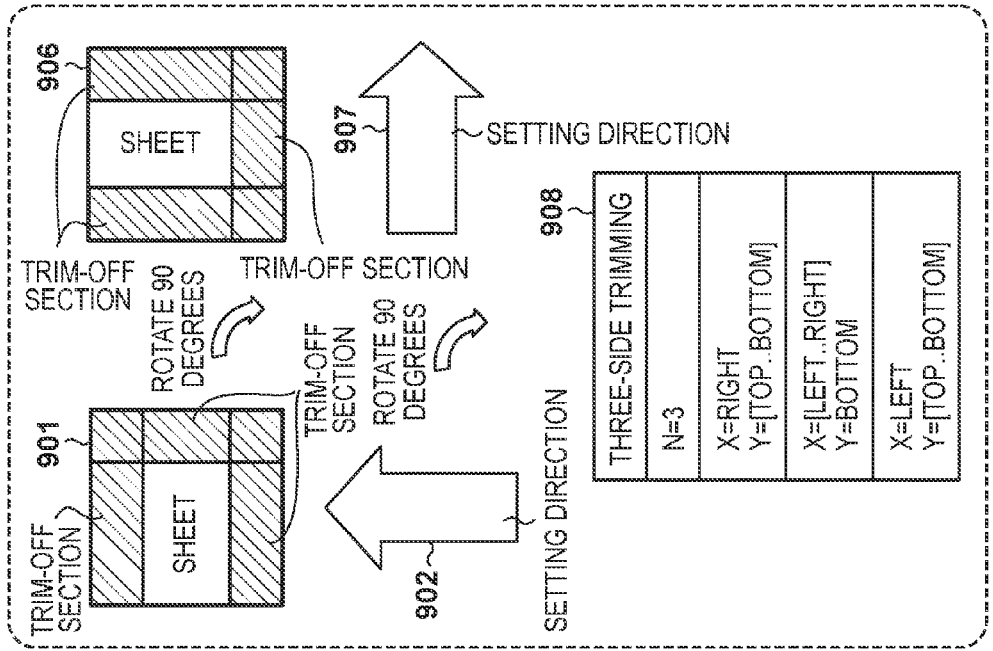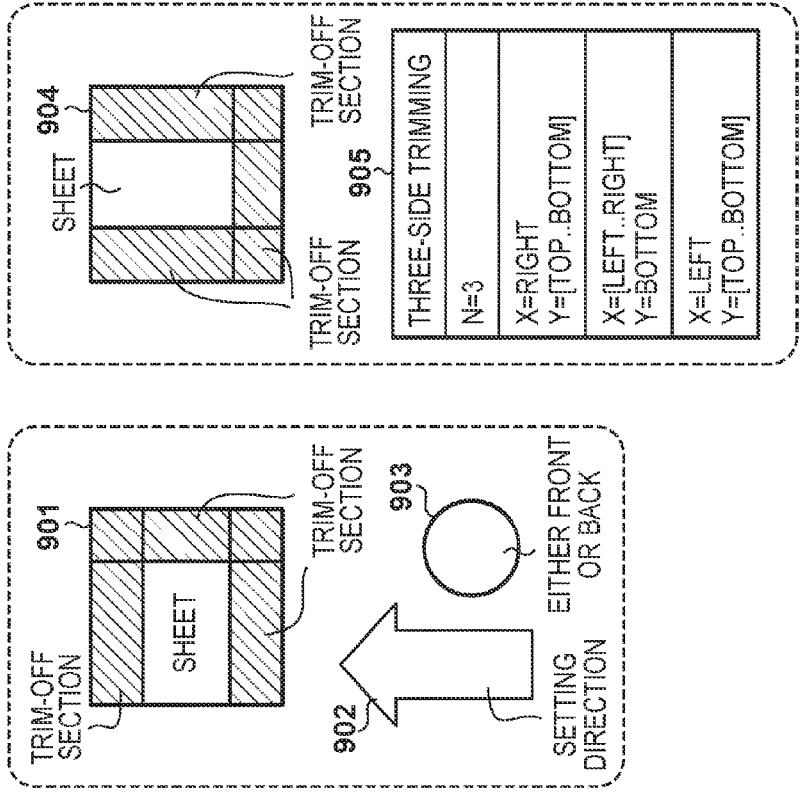

F I G. 16B
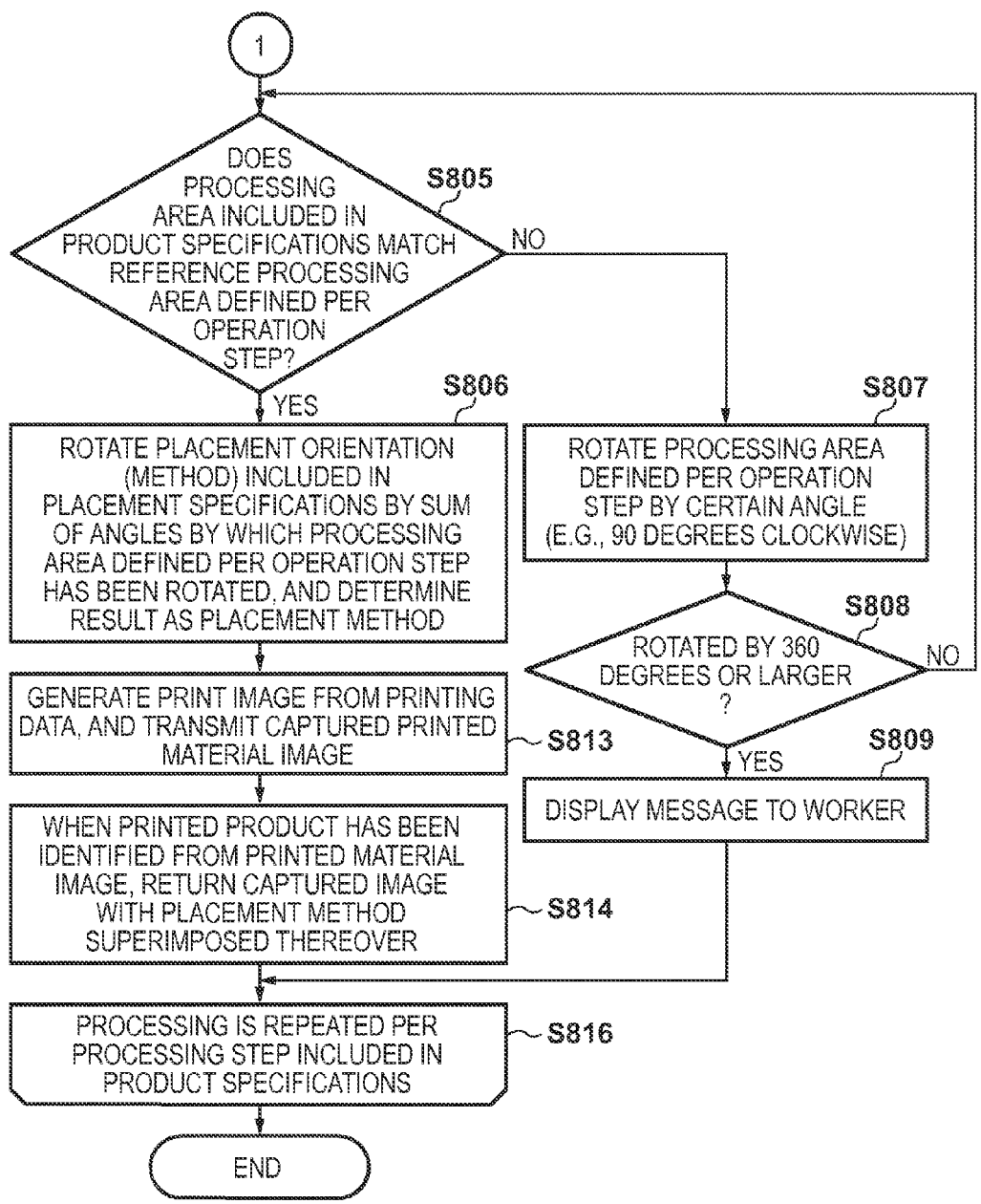

FIG. 17

| 1701 |
|---|

1702

| SELECTED | OPERATION STEP | MANUFACTURING APPARATUS |
|---|---|---|
| ○ | PRINTING STEP | PRINTING DEVICE C |
| ● | CASE BINDING | CASE BINDING DEVICE B |
| ○ | THREE-SIDE TRIMMING | THREE-SIDE TRIMMING DEVICE A |

PLEASE SELECT A MANUFACTURING APPARATUS TO BE REPLACED.

PLEASE SELECT AN ALTERNATIVE MANUFACTURING APPARATUS.

1703

| SELECTED | OPERATION STEP | MANUFACTURING APPARATUS |
|---|---|---|
| ○ | PRINTING STEP | PRINTING DEVICE A |
| ○ | PRINTING STEP | PRINTING DEVICE B |
| ● | CASE BINDING | CASE BINDING DEVICE A |
| ○ | THREE-SIDE TRIMMING | HREE-SIDE TRIMMING DEVICE B |
| ○ | THREE-SIDE TRIMMING | HREE-SIDE TRIMMING DEVICE C |

1704  1705

| CANCEL | OK |
|---|---|

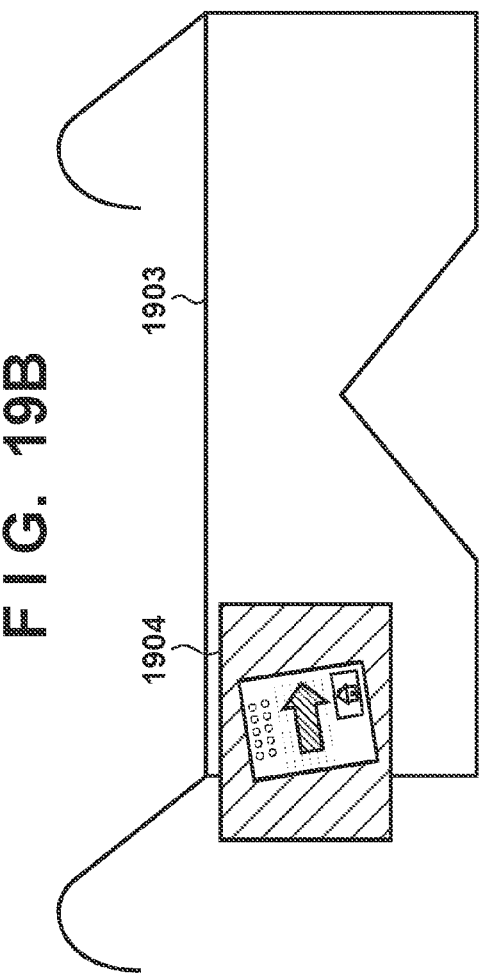
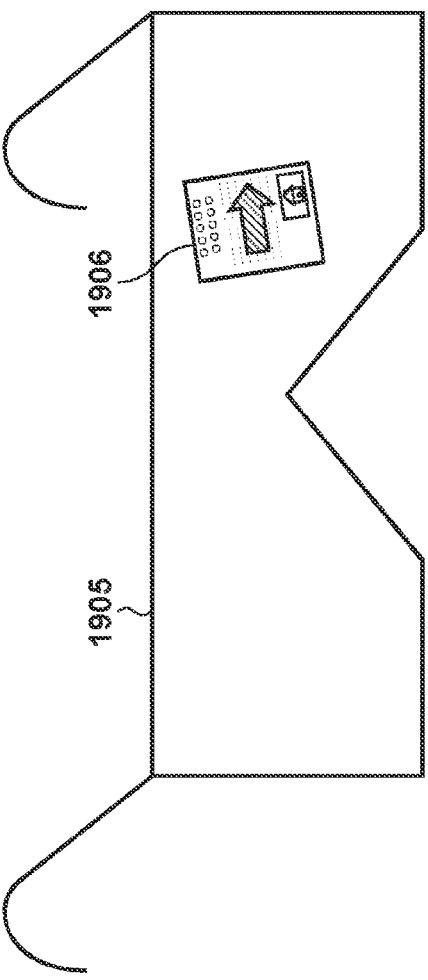
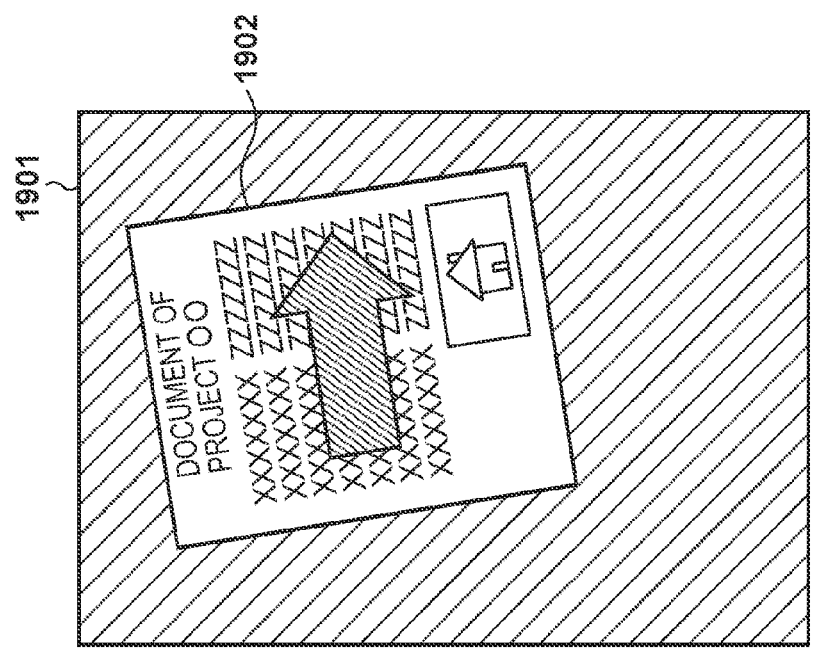
FIG. 19A
FIG. 19B
FIG. 19C

PRINTING SYSTEM, PRINTING ASSISTANCE APPARATUS AND METHOD

BACKGROUND OF THE INVENTION

1. Field of the Invention

The present invention relates to a printing system and to a printing assistance apparatus and method, e.g., management of operation steps in the manufacture of a printed product ordered through a printing order system that receives a request to manufacture printed material from a customer.

2. Description of the Related Art

In the fields related to the manufacture of printed products, to cope with the complexity and diversity of printing operations, manufacturing apparatuses used in the manufacture of printed products, such as printing devices and processing devices, are becoming complex and diverse. This makes it difficult for workers to fully comprehend all of the contents of operations for printed products. In particular, in post-processing steps where printed sheets undergo printing and processing in various printing devices and processing devices, a direction in which a stack of sheets is set varies with each printing device and processing device. Therefore, practice is required in setting a stack of sheets in a correct direction.

There is a printing service called web-to-print in which a printing order from a client is received on the web, followed by the manufacture and delivery of a printed product. In web-to-print, clients order a wide variety of types of printed products, and therefore a large number of types of printed products are handled in small lots. This makes it even harder for workers to fully comprehend all of the methods for producing the printed products. To address the foregoing issue, manufacturing operations, such as printing steps and processing steps, are preset as operation steps per printed product, and a written operation instruction describing such operation steps is generated.

Workers need to set sheets in a correct direction, at their own discretion, on the basis of the processing specifications of a printed product obtained from the written operation instruction (a printing orientation, a processing position, etc.) and the specifications of manufacturing apparatuses acknowledged by the workers.

However, as the decisions are left to the workers, there is a risk of losing printed sheets in the case where a wrong setting direction is used by mistake in manufacturing apparatuses, such as printing devices and processing devices. Furthermore, when there is a plurality of manufacturing apparatuses, experience is required to acknowledge and accurately determine a setting direction in each manufacturing apparatus.

There is a conventional technique to assist in operations in post-processing steps as disclosed in, for example, Japanese Patent Laid-Open No. 2012-236322. The technique disclosed in Japanese Patent Laid-Open No. 2012-236322 first identifies, from a stack of sheets, an area that a customer cannot see in a final printed product as a result of carrying out predetermined post-processing (trimming and binding) designated by a print job. Here, the area that the customer cannot see is, for example, a fragment that is detached as a result of trimming, i.e., a bleed, or an end face to which a cover is attached in binding. Such an area that is lost or an area in which written information cannot be seen as a result of post-processing will hereinafter be referred to as an area that becomes invisible. Next, instruction information related to the post-processing steps is added to the area that becomes invisible, e.g., "bleed" is printed in a portion that will be trimmed off as a result of trimming; in this way, an instruction about the post-processing steps can be issued appropriately without damaging the appearance of a final printed product.

Meanwhile, in the technique disclosed in Japanese Patent Laid-Open No. 2006-301742, first of all, device dependence information that is provided per device, such as a processing device, connected to a manufacturing apparatus is managed as a template. By combining a template and a print job, a written operation instruction can be generated in consideration of post-processing steps. For example, a description can be provided in a written operation instruction so as not to trim output material that exceeds the capability of a trimming device in terms of thickness in the trimming device. It is also possible to illustrate a sheet setting direction by attaching an image of the actual printed material to a written operation instruction.

According to Japanese Patent Laid-Open No. 2012-236322, for example, in the case of trimming, workers can be assisted in post-processing steps by providing an area that becomes invisible with information indicating a bleed. However, Japanese Patent Laid-Open No. 2012-236322 does not provide a mechanism for managing the placement specifications per manufacturing apparatus, e.g., correspondence between the orientation in which a stack of sheets is set in a manufacturing apparatus and an area to which processing is applied on the sheets. Therefore, in Japanese Patent Laid-Open No. 2012-236322, although it is possible to add the orientation in which printed material targeted for post-processing is set in a post-processing apparatus currently used to an area of the printed material that becomes invisible based on the placement specifications of the post-processing apparatus, upon switching to a post-processing apparatus with different placement specifications, workers can no longer be informed of a correct orientation in which a stack of sheets is set if an instruction for printing in the area that becomes invisible is left unchanged.

Japanese Patent Laid-Open No. 2006-301742 makes it possible to generate a written operation instruction in consideration of post-processing steps from device dependence information and a print job related to the post-processing steps. However, it does not provide a mechanism for managing the placement specifications per manufacturing apparatus, similarly to Japanese Patent Laid-Open No. 2012-236322. Therefore, upon switching to a post-processing apparatus with different placement specifications in the post-processing steps, workers cannot be informed of a correct orientation in which a stack of sheets is set.

SUMMARY OF THE INVENTION

The present invention has been made to solve the foregoing problems, and provides a system capable of informing a worker of how to set sheets correctly in a post-processing apparatus.

A system according to the present invention has the following configuration.

According to one aspect, there is provided a printing system for producing printed material by executing, based on specification information defining processing steps, each processing step using a corresponding one of a plurality of processing apparatuses, the printing system comprising: a storage unit that stores property information per processing apparatus, the property information including information indicating a reference placement direction of a sheet and information indicating a processing area in which the sheet placed in the placement direction is processed; a determination unit that determines a placement direction of the sheet for matching a processing area of a processing apparatus designated by the specification information with the processing area indicated by the property information; and an output unit that outputs the placement direction determined by the determination unit.

The present invention makes it possible to issue, to a worker, a proper instruction for setting sheets correctly in a post-processing apparatus in accordance with the specifications of the post-processing apparatus. Therefore, by preventing error in setting the sheets, not only can the productivity be improved, but wasting of resources can also be prevented.

Further features of the present invention will become apparent from the following description of exemplary embodiments (with reference to the attached drawings).

BRIEF DESCRIPTION OF THE DRAWINGS

FIGS. 6A to 6F show examples of data representing a processing area.

FIG. 7 shows an example of data representing the placement specifications.

FIGS. 9A to 9C are conceptual diagrams showing processing for determining a placement method.

FIGS. 16A and 16B show flowcharts for determining and outputting a placement method according to the fifth embodiment.

FIG. 17 shows an example of a screen for selecting an alternative manufacturing apparatus in the third embodiment.

FIGS. 19A to 19C show examples in which a placement method is displayed by being superimposed over an image of printed material in the fifth embodiment.

DESCRIPTION OF THE EMBODIMENTS

The following describes embodiments of the present invention with reference to the drawings.

First Embodiment

<Overall Outline>

Figure 1:
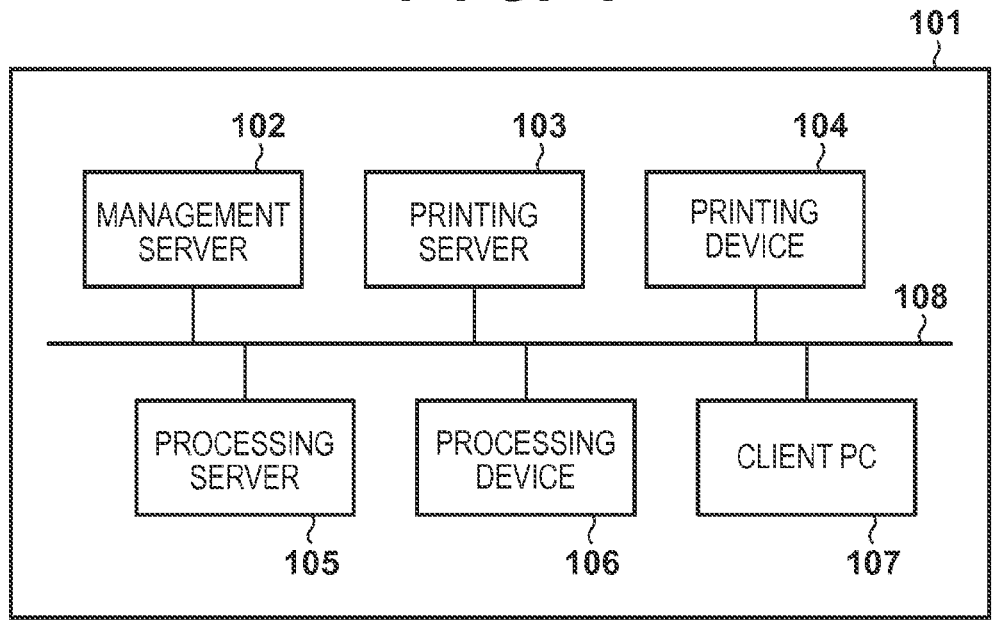
FIG. 1 is a block diagram showing a configuration of a printing assistance system according to an embodiment.

A description is now given of a first embodiment of the present invention. The first embodiment solves the problems by managing a placement orientation, which varies with each manufacturing apparatus, and determining a placement method. Manufacturing apparatuses include a printing apparatus, a post-printing processing apparatus, and the like, and are also referred to as processing apparatuses. First, a configuration of a printing system according to the present embodiment will be described with reference to FIG. 1. In FIG. 1, a printing system 101 includes a management server 102, a printing server 103, a printing device 104, a processing server 105, a processing device 106, and a client PC 107 that are connected by a network 108 and can communicate with one another. The management server 102 generates printing information based on a printing order received from the client PC 107. The printing server 103 executes preprocessing that is necessary for printing in accordance with the printing information, and then issues a printing instruction. The printing instruction may be issued online to the printing device 104, or may be issued to an operator. In the latter case, the operator operates the printing device 104 in accordance with the printing instruction. The printing device 104 performs printing to produce a printed product in accordance with the issued printing instruction. The processing server 105 executes preprocessing that is necessary for processing in accordance with the printing information, and then issues a processing instruction. The processing device 106 processes the printed product in accordance with the issued processing instruction. The client PC 107 receives input from a user and issues the printing order.

The processing device 106 is a post-processing apparatus for carrying out post-printing processing in accordance with the processing instruction, and is, for example, a folding device, a bookbinding device, a trimming device, or a combination thereof. A stack of sheets to be processed is moved manually by the operator from a printing device or a processing device in a preceding stage, and then placed in the foregoing post-processing apparatuses in a predetermined orientation. In accordance with the received processing instruction (also referred to as a job ticket), the processing device 106 processes the placed stack of sheets. To establish synchronization between the placement of the stack of sheets and the processing instruction, for example, a print job ID is printed on a bleed and assigned to the processing instruction, and the operator who has placed the stack of sheets selects this processing instruction from among a list of received processing instructions displayed on the processing device; as a result, processing is started. It goes without saying that the foregoing is an example method, and it is possible to adopt other methods for managing correspondence between processing instructions and stacks of sheets for which the processing instructions have been issued. Although the management server 102, the printing server 103, and the processing server 105 are each connected to the network, these servers may constitute one server into which their respective server functions are integrated. The management server 102 can also be referred to as a printing assistance apparatus as it executes processing for assisting in printing operations.

Figure 2:
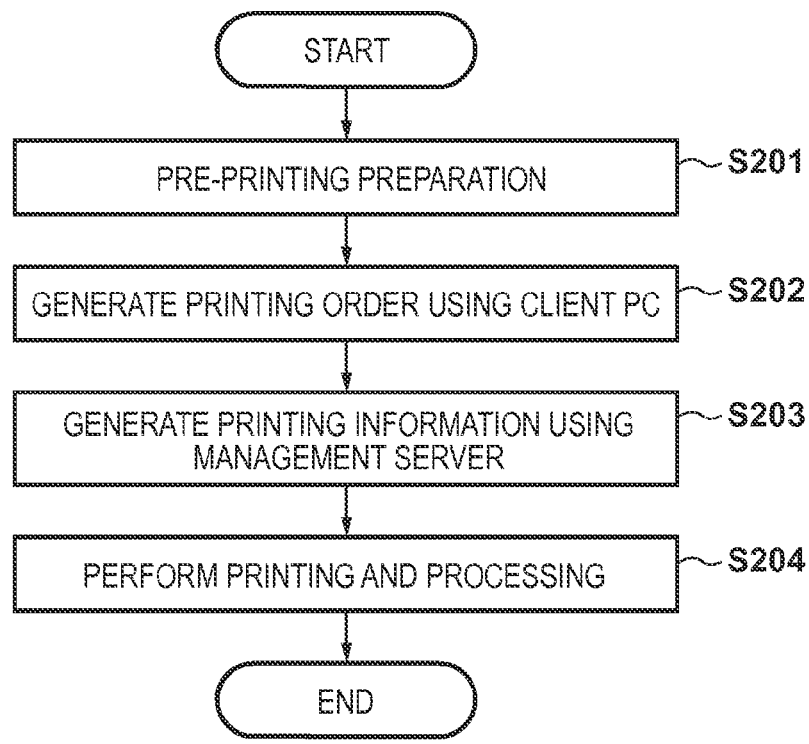
FIG. 2 is a flowchart showing an outline of processing according to the embodiment.

The following describes the flow of processing executed by the printing system 101 with reference to a flowchart of FIG. 2. In step S201, using the management server 102, the printing system 101 generates and stores information such as the product specifications (also referred to as the finish specifications), a processing area, the placement specifications, and an output area of a printed product (also referred to as printed material) under an instruction from an administrator of a printing office. At this time, the administrator and a worker may be the same person. Data structures of product specification information (hereinafter referred to as specification information, or simply the product specifications), processing area information (hereinafter simply referred to as a processing area), placement specification information (hereinafter simply referred to as the placement specifications), and output area information (hereinafter simply referred to as an output area) will be described later. An outline will now be described. The product specifications include information such as material of the printed product (i.e., sheets), steps necessary for the manufacture of the printed product, such as a printing step and a processing step, models of processing apparatuses that carry out the steps, detailed settings for the steps, and a product identifier that uniquely identifies the printed product. It should be noted that "sheets" are not limited to sheets of paper, and include sheet-like mediums on which printing is conducted. For each processing step, a processing area includes information related to a portion of the material to be processed, that is to say, a portion targeted for processing. For example, in the case of three-side trimming, three edges of the sheets that serve as a bleed (also referred to as a trim-off section) are defined as a processing area. The placement specifications include information related to a placement direction that varies with each manufacturing apparatus, the placement direction defining a processing area, the orientation in which the sheets are set in a manufacturing apparatus, and the like. The placement direction will be described with reference to FIGS. 6A to 6F. The output area includes information related to an area on the sheets in which a placement method is printed. It is preferable that the output area be included in, for example, a processing area that ultimately becomes invisible as a result of trimming processing. The output area can be defined in a format similar to that of the processing area. For example, with regard to the placement specifications that can be shared among print jobs, step S201 need not always be executed before step S202 as long as it is executed each time a manufacturing apparatus, such as a post-processing apparatus, is added or updated. In step S202, the printing system 101 generates printing order information using the client PC 107 under an instruction from the user, and transmits the printing order information to the management server 102. Hereinafter, the printing order information is referred to as a printing order. A printing order includes, for example, information related to an order identifier for identifying a printed product ordered by the user, manuscript data to be used in printing, the number of orders, the number of printed products, a shipping destination, and payment. At this time, if the order identifier matches a product identifier included in the product specifications, the printed material produced in accordance with the product specifications is the printed product ordered by a client. Therefore, an order and the corresponding product specifications are assigned the same identifier. In step S203, the management server 102 receives the printing order transmitted in step S202, and generates printing information using the management server 102 based on the received printing order. The printing information includes a placement method, placement method output information, printing data, and the like. The placement method is determined based on the product specifications, the placement specifications, and a processing area, and designates a placement direction which is information indicating the orientation in which a stack of sheets is set in a manufacturing apparatus, as well as a placement side which is information indicating the front and back of the stack of sheets to be set. The placement method output information includes information for outputting the placement method to an output area of the printing data. The printing data includes information indicating manuscript data reflecting various types of processing. In step S204, the printing system 101 generates a print job and a processing job using the printing server 103 and the processing server 105 under an instruction from the worker, and performs printing and processing using the printing device 104 and the processing device 106, respectively. Through the above-described steps S201 to S204, the worker performs operations for manufacturing a printed product in accordance with operation instructions.

<Configuration of Information Processing Apparatus>

Figure 3:
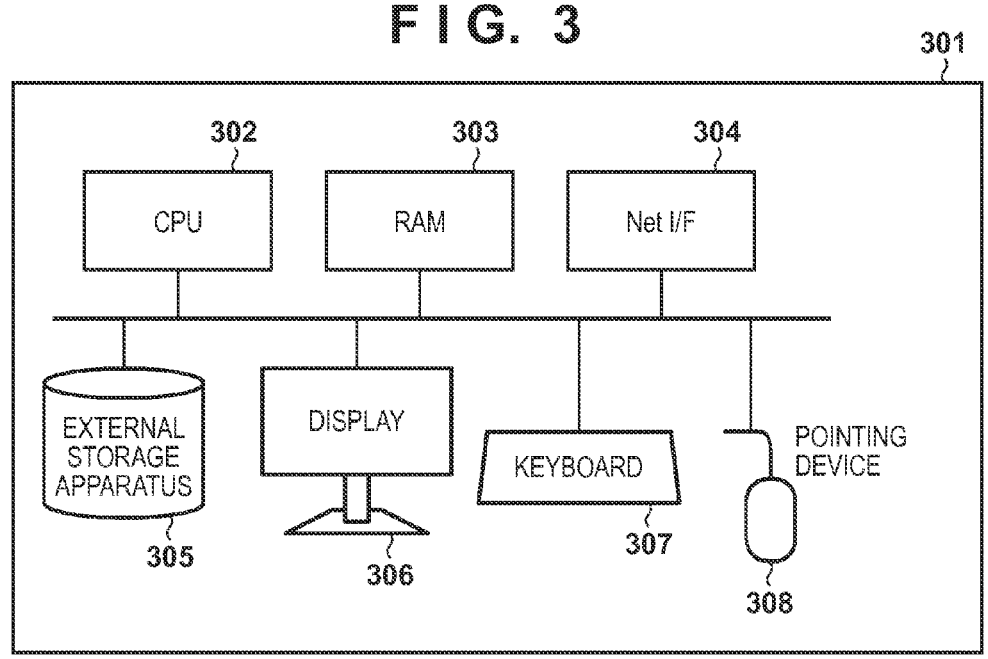
FIG. 3 is a block diagram showing a configuration of an information processing apparatus according to the embodiment.

With reference to FIG. 3, the following describes a configuration of an information processing apparatus 301 according to the embodiments of the present invention. A schematic diagram of the information processing apparatus 301 shown in FIG. 3 is an example of a configuration shared among the management server 102, the printing server 103, the processing server 105, and the client PC 107. A CPU 302 controls the entirety of the present apparatus in accordance with a control program stored in a RAM 303. A RAM 303 is an internal storage unit that stores the control program for the present apparatus, which is executed by the CPU 302, and data of documents, images, and the like. A network interface (net I/F) 304 transmits and receives data and the like by way of connection to the network under control by the CPU 302. An external storage apparatus 305 is, for example, a magnetic disk storing data. The information processing apparatus 301 also includes a display 306, a keyboard 307, and a pointing device such as a mouse 308. In order to run in a predetermined manner, the program stored in the RAM 303 uses the functions of an operating system (OS), which is also stored in the RAM 303, as necessary. The program stored in the RAM 303 also reads and writes the contents of data to be temporarily stored in the RAM 303, reads and writes data from and to the external storage apparatus 305, and transmits and receives data via the net I/F 304. The program stored in the RAM 303 also receives input from the keyboard 307 and the pointing device 308, and performs display on the display 306.

<Structure of Placement Method Determination Assistance Program>

Figure 4:
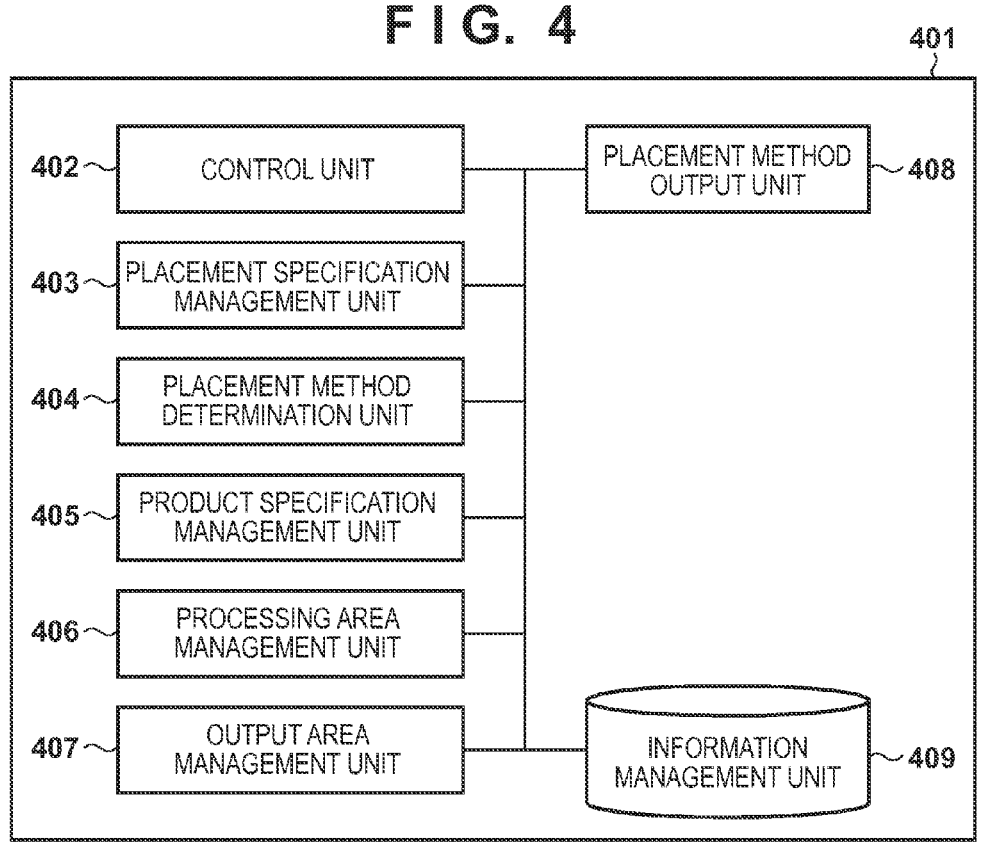
FIG. 4 is a block diagram showing a structure of a program according to the embodiment.

FIG. 4 is a block diagram showing a structure of a placement method determination assistance program 401. The placement method determination assistance program 401 is installed in the management server 102 and runs while using the functions of the OS as necessary. A control unit 402 controls the entirety of the program and issues processing instructions to modules 403 to 407. Upon receiving an instruction from the control unit 402, a placement specification management unit 403 manages the placement specifications per manufacturing apparatus. Upon receiving an instruction from the control unit 402, a placement method determination unit 404 determines a placement method based on the placement specifications, the product specifications, and a processing area managed by the placement specification management unit 403 and the later-described product specification management unit 405 and processing area management unit 406. Upon receiving an instruction from the control unit 402, the product specification management unit 405 manages the product specifications. The product specifications managed here are used by the placement method determination unit 404 in determining the placement method. Upon receiving an instruction from the control unit 402, the processing area management unit 406 manages a reference processing area for each operation step in post-processing and the like. The reference processing area managed here is used by the placement method determination unit 404 in determining the placement method. Upon receiving an instruction from the control unit 402, an output area management unit 407 manages an output area. The placement method determined by the placement method determination unit 404 is output to the output area managed here. Upon receiving an instruction from the control unit 402, a placement method output unit 408 outputs the placement method determined by the placement method determination unit 404 to the output area of printing data managed by 407. Upon receiving an instruction from the control unit 402, an information management unit 409 saves information related to the placement method determination assistance program 401, such as the product specifications, the printing order, and the printing information.

<Data Structure of Product Specifications and Data Structure of Output Area>

A data structure of the product specifications according to the present embodiment will now be described with reference to FIG. 5. Information of such product specifications (finish specifications) is stored in the management server 102. The following describes the product specifications for the manufacture of a case-bound book. A case-bound book is a book that is manufactured using a bookbinding method in which an adhesive is applied to a side or a spine of a textblock composed of a plurality of pages, and then the textblock is bound by wrapping the textblock with a cover.

Sheet specification information 501, 502 shows the specifications of sheets that are used as the material in the manufacture of the case-bound book, and defines, for example, the manufacturers, brands, ream weights, and size of the sheets. It should be noted that the sheet specification information 501 shows the specifications of a sheet used as a cover, and the sheet specification information 502 shows the specifications of sheets used as the textblock. Printing step information 503 and printing step information 504 show information that is necessary for printing steps in the manufacture of the case-bound book, and define information that is necessary for printing the cover and the textblock, such as a model name of a manufacturing apparatus (printing device), print settings, print colors, a print side, a processing area, etc. It should be noted that the printing step information 503 shows information necessary for a printing step for the cover, and the printing step information 504 shows information necessary for a printing step for the textblock. Processing step information 505 shows information that is necessary for a processing step in the manufacture of the case-bound book, and defines information such as a processing type, a model name of a manufacturing apparatus (processing device), process settings, a processing area, and an output area, which are necessary for processing the sheets of the cover and the textblock that have been printed in accordance with the printing step information 503 and the printing step information 504, respectively, to produce the case-bound book. Processing step information 506 shows information that is necessary for another processing step in the manufacture of the case-bound book; in the present example, it relates to a processing type of three-side trimming. The items set therein are similar to those set in the processing step information 505, and therefore a description thereof is omitted. A product identifier 507 uniquely identifies a printed product; one product identifier is set for one set of product specifications. In FIG. 5, relationships among sheet specifications and operation steps are indicated by arrows. Especially, the order of operations of various operation steps is indicated by arrows. Specifically, after the print processing defined by the printing step information 503 and the print processing defined by the printing step information 504, processing defined by the processing step information 505 is carried out, and then processing defined by the processing step information 506 is carried out. An output area, to which the placement method determined in the later-described step S807 can be output (i.e., printed), is set in certain operation steps. By setting the output area in an area that becomes invisible, the worker can be informed of the placement method without lowering the quality of the completed printed product. The following describes an example of setting the output area for the processing step information 505. By setting the output area in an area that becomes invisible among the processing areas set in the processing step of the processing step information 505 or in a subsequent step(s), e.g., in the processing step information 506 of three-side trimming, the placement method printed in the output area cannot be seen as a result of trimming. At this time, the administrator of the printing office sets the output area such that the placement method output for a certain operation step will not be lost as a result of trimming before that certain operation step.

<Conceptual Diagrams and Data Structures of Processing Area>

Conceptual diagrams and data structures of a processing area will now be described. A processed area of material varies with each operation step, and different processing areas are set in the printing step information 503, the printing step information 504, the processing step information 505, and the processing step information 506. The processing area management unit 406 manages one typical processing area per operation step type. This is the above-mentioned reference processing area. There are cases in which different processing areas are set in a plurality of operation steps of the same type. There are also cases in which different processing areas are set for a plurality of post-processing apparatuses of the same type, depending on the sheet placement directions. However, a relative relationship among processing areas remains the same in operation steps of the same type, regardless of the definitions of the processing areas of the operation steps included in the product specifications, or the apparatuses to be used. For example, in any three-side trimming device, no matter what the model is, three adjacent edges always serve as a processing area. Furthermore, although a processing area defined in an operation step may vary depending on the product specifications, three adjacent edges always serve as a processing area. In view of this, for each operation step type, a typical processing area is defined as a reference processing area and stored in the processing area management unit 406. Depending on the operation step type, the processing area information stored in the processing area management unit 406 is associated with the placement specifications. With reference to FIGS. 6A to 6F, the following describes specific examples of this processing area provided per operation step type.

Figure 6A:
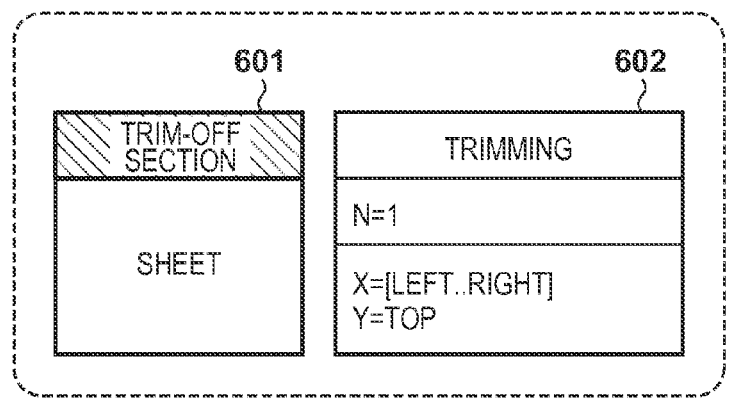
Figure 6B:
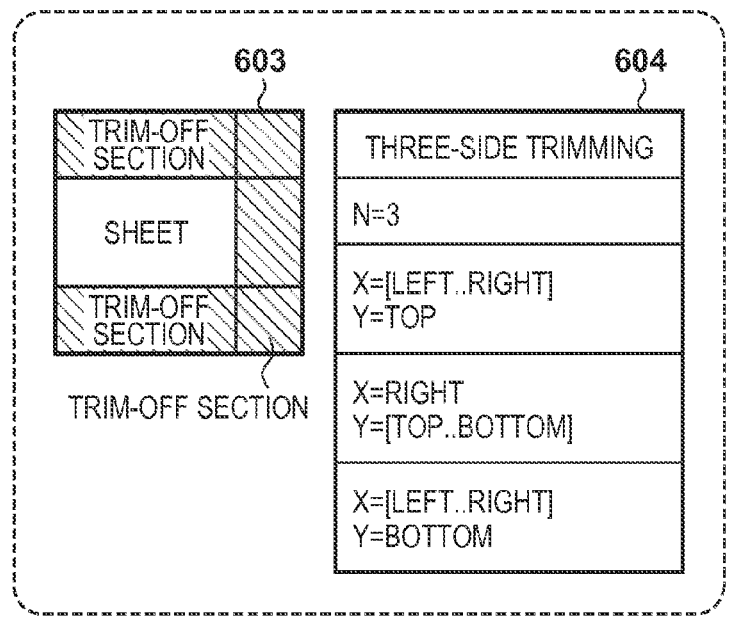
Figure 6C:
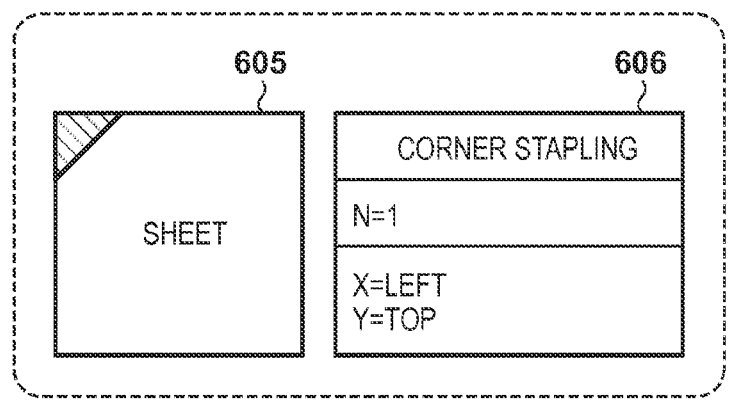

FIG. 6F shows an example of stored data of a processing area. As shown in FIG. 6F, one processing area is composed of sections defining an operation step name, the number of areas N, and the positions and ranges of areas X, Y. Here, X and Y respectively indicate a width direction and a vertical direction of the sheets, and one area is defined by designating the positions and ranges of X and Y. When a plurality of processing areas are defined, a sum of the plurality of processing areas is defined as a processing area. Examples of the positions include LEFT, RIGHT, CENTER, TOP, and BOTTOM, which respectively indicate the left end, the right end, the center, the top end, and the bottom end of the sheets. A range is expressed by designating two of these positions. For example, [LEFT . . . RIGHT] indicates a range from the left end to the right end. Similarly, [TOP . . . BOTTOM] indicates a range from the top end to the bottom end. FIG. 6A is a diagram for describing a processing area for an operation step of trimming. Processing area information 602 is an example of stored data for the case of trimming. The processing area information 602 indicates that there is one area, and that this area is in a range from the left end to the right end in the width direction and is positioned at the top end in the vertical direction. An icon 601 illustrates a bleed represented by this processing area on a sheet. It should be noted that the icon 601 is presented for the sake of illustration of the processing area, and is not displayed in practice. FIG. 6B is a diagram for describing a processing area for an operation step of three-side trimming. Processing area information 604 is an example of stored data for the case of three-side trimming, and includes three areas. The first area is in a range from the left end to the right end in the width direction, and is positioned at the top end in the vertical direction. The second area is positioned at the right end in the width direction, and is in a range from the top end to the bottom end in the vertical direction. The third area is in a range from the left end to the right end in the width direction, and is positioned at the bottom end in the vertical direction. In this case, a sum of these three areas serves as the processing area, and an icon 603 illustrates a bleed represented by this processing area on a sheet. FIG. 6C is a diagram for describing a processing area for an operation step of corner stapling. Processing area information 606 is an example of stored data for the case of corner stapling; it indicates that there is one area, and that this area is positioned at the left end in the width direction and at the top end in the vertical direction. An icon 605 illustrates a corner stapling position represented by this processing area on a sheet. FIG. 6D is a diagram for describing a processing area for an operation step of case binding (textblock). Processing area information 608 is an example of stored data for the case of case binding (textblock); it indicates that there is one area, and that this area is in a range from the left end to the right end in the width direction and is positioned at the top end in the vertical direction. An icon 607 illustrates an adhesive application section represented by this processing area on a sheet. FIG. 6E is a diagram for describing a processing area for an operation step of case binding (cover). Processing area information 610 is an example of stored data for the case of case binding (cover); it indicates that there is one area, and that this area is positioned at the center of a sheet in the width direction and is in a range from the top end to the bottom end in the vertical direction. An icon 609 illustrates an adhesive application section represented by this processing area on a sheet.

The formats shown in FIGS. 6A to 6F are applicable not only to reference processing areas, but also to processing areas that are defined in one-to-one correspondence with operation steps included in the product specifications. The following describes differences between a reference processing area and a processing area defined per operation step. A reference processing area is a typical processing area that is determined per operation step, and is a processing area pertaining to the case in which sheets have been placed on the basis of a placement direction and a placement side defined by the later-described placement specifications, such that the sides indicated by the placement side are facing up and the edges of the sheets indicated by the placement direction are facing a reference direction (e.g., a direction of insertion of the sheets into a sheet insertion slot of the apparatus). The placement direction and the placement side may vary depending on the apparatus. On the other hand, processing areas that are defined in one-to-one correspondence with operation steps included in the product specifications indicate the positions of the edges to be processed in the state where, for example, the printed material is in an upright state. For example, in a step of three-side trimming for printed material that has been bound on the right side, the top, bottom, and left sides are designated as a processing area. In this case, a reference placement method is preset; for example, the top denotes the top direction of the printed material in an upright state, and the cover faces up. It goes without saying that the foregoing definitions may be changed in any manner as long as the reference is clear. Therefore, the reference processing area and a processing area defined by the product specifications may differ in operation steps of the same type.

<Data Structure of Placement Specifications>

A data structure of the placement specifications according to the present invention will now be described with reference to FIG. 7. A manufacturing apparatus name 701 indicates a manufacturing apparatus. For example, the names of manufacturing apparatuses, such as a trimming device A, a trimming device B, and a case binding device C, are set. It should be noted that the names of manufacturing apparatuses used here may be model names as a placement direction is determined based on a model. When a placement direction varies in the same model, an individual name is set. An operation step type 702 is a type of an operation step, and indicates a type of executable processing. For example, "trimming" is set for the trimming device A and the trimming device B. On the other hand, "case binding" is set for the case binding device C. A placement direction 703 and a placement side 704 indicate a sheet placement method, which varies with each manufacturing apparatus. Under the placement direction 703, the "orientation" in which sheets are set in the corresponding manufacturing apparatus is set. Here, the orientation of an arrow is determined on the basis of a processing area that is defined per operation step type. The orientation of the arrow indicates, for example, a reference edge of printed material, and indicates that a reference processing area will be processed if the printed material is placed with its reference edge facing a reference direction of a post-processing apparatus. It is assumed here that, for example, the placement side 704 is the front side. It is preferable that, for the sake of usability, a reference direction of a processing apparatus be defined independently from a model of a post-processing apparatus; for example, a direction of insertion of sheets into a sheet insertion slot of the apparatus is preset as the reference direction. By registering the placement direction and the reference processing area per model in advance, the direction in which the sheets should be placed can be determined per step.

For example, assume a case in which a stack of printed sheets is held by hands while facing up (i.e., in an upright state), and processing is applied to an area of the stack of printed sheets that is the same as a processing area defined per operation step type. Specifically, if the orientation of the arrow designated by the placement direction 703 is upward (i.e., the top edge is the reference edge on the basis of the upright state of the printed material), the stack of printed sheets is set from the top end thereof by making the top end thereof oppose the sheet insertion slot of the corresponding manufacturing apparatus. If the orientation of the arrow is rightward, the stack of printed sheets is set from the right end thereof by making the right end thereof (i.e., the right edge serving as the reference edge) oppose the sheet insertion slot. By thus setting sheets in an orientation designated by the placement direction 703, processing can be applied to a processing area defined per operation step type included in the placement specifications. When a stack of sheets is held by hands while facing up, an area intended for processing may not match a processing area defined per operation step type. In this case, as will be described later, a placement method is determined also in consideration of a processing area included in the product specifications. Although the placement direction is designated in increments of 90 degrees in the figure, the placement direction may be designated by any degree. However, it is required that a processing area can be designated in accordance with increments of the placement direction. Therefore, for example, a processing area may be described using a more flexible description method, e.g., using a direction indicating the center of the processing area and an angle of spread from the center represented by that direction. Under the placement side 704, information indicating "front/back" is set in association with a reference processing area, e.g., information indicating that the "front" should face up, the "back" should face up, or "either" is fine when setting the sheets.

As described above, the placement specifications, which are information indicating a placement direction of sheets, and processing area information indicating a processed area of the sheets placed in that placement direction are managed per processing apparatus; they will be collectively referred to as property information of the processing apparatus.

<Flowchart in First Embodiment>

Figure 8:
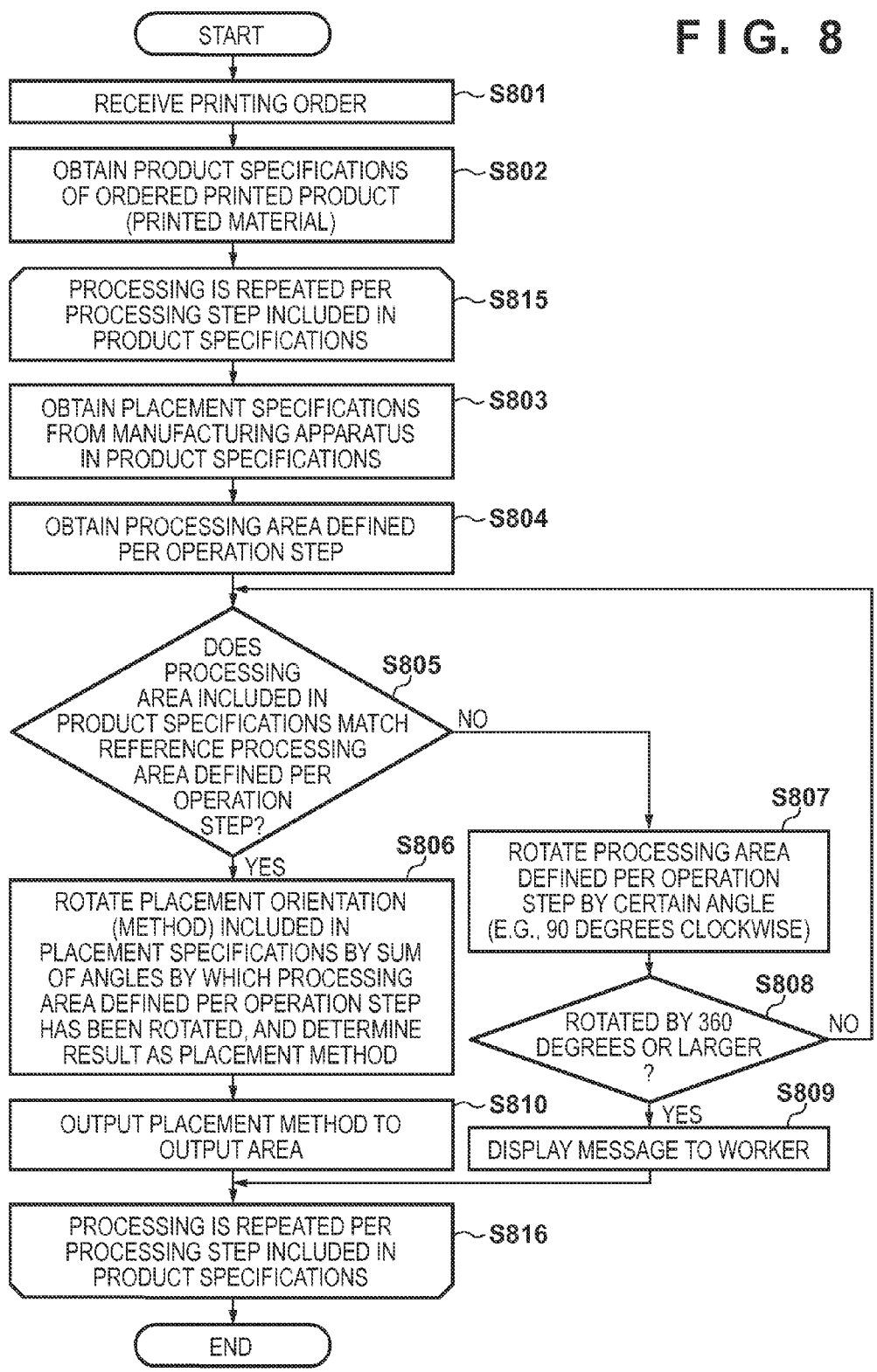
FIG. 8 is a flowchart for determining and outputting a placement method.

The following describes a processing flow for determining and outputting a placement method in the present embodiment with reference to FIG. 8. FIG. 8 is a diagram for describing a detailed flow of step S203 of FIG. 2 in which the management server generates printing information. Specifically, this is a diagram for describing a processing flow for determining a placement method and a processing flow for outputting the placement method to an output area, the former being performed by the placement method determination unit 404 included in the placement method determination assistance program 401 installed in the management server 102, and the latter being performed by the placement method output unit 408 included in the same. In step S801, the placement method determination unit 404 receives a printing order that is transmitted from the client PC 107 in step S202. In step S802, the placement method determination unit 404 obtains, from the product specification management unit 405, the product specifications corresponding to an order identifier included in the printing order that was received in step S801. At this time, the obtained product specifications managed by the product specifications management unit 405 includes the product identifier 507 that matches the order identifier included in the printing order. In step S803 onward, processing is executed per processing step included in the product specifications 508 obtained in step S802. This is indicated by loop processing from step S815 to step S816. The following describes the case in which processing of the processing step 506, whose type is three-side trimming, is performed out of the processing steps 505, 506 included in the product specifications 508.

In step S803, the placement method determination unit 404 obtains, from among the sets of placement specifications shown in FIG. 7, a set of placement specifications whose manufacturing apparatus 701 matches the manufacturing apparatus associated with the processing step 506. Specifically, in the case where the manufacturing apparatus associated with the processing step 506 is a three-side trimming device A, a row including the three-side trimming device A under the manufacturing apparatus 701 is obtained as the set of placement specifications. In step S804, based on the operation step type 702 associated with the placement specifications obtained in step S803, the placement method determination unit 404 obtains, from the processing area management unit 406, a reference processing area defined per operation step type. In the case of the operation step of three-side trimming, the processing area 604 shown in FIG. 6B is obtained.

In step S805, the placement method determination unit 404 determines whether the processing area included in the processing step 506 defined by the product specifications 508 matches the reference processing area 604 for the operation step of three-side trimming, which was obtained in step S804. Here, the processing area information included in the processing step 506 is stored in a format similar to that of the processing area 604 shown in FIG. 6B. At this time, whether the processing areas match is checked specifically by determining whether the values of X and Y designated in the three areas representing the processing area included in the processing step 506 match the values designated in the processing area 604 for the operation step of three-side trimming. If they match, the processing proceeds to step S806. If they do not match, the processing proceeds to step S807. In step S807, the placement method determination unit 404 rotates the reference processing area associated with the placement specifications by a certain angle, e.g., 90 degrees clockwise. At this time, the direction and angle of rotation are stored in the RAM 303. When the rotation is repeated multiple times, the rotated reference processing area stored in the RAM 303 is further rotated. When the process of step S807 is repeated, the placement method determination unit 404 obtains the angles stored in the RAM 303, calculates a sum of the angles of rotation, and stores the calculated sum of the angles in the RAM 303 by way of overwriting. In step S808, the placement method determination unit 404 determines whether the sum of the angles by which the reference processing area defined per operation step has been rotated is equal to or larger than 360 degrees, and proceeds to step S809 if the sum is equal to or larger than 360 degrees. If the sum is smaller than 360 degrees, the processing returns to step S805, and whether the processing areas match is determined again. In step S809, the placement method determination unit 404 displays, to the worker, a message indicating that the placement method cannot be determined due to inconsistency between the processing area included in the product specifications and the reference processing area defined per operation step type, and then ends the processing. It should be noted that, at the time of rotation of the processing area in step S807, it is necessary to convert the processing area information in accordance with the rotation. This is for comparison in step S805. Therefore, for example, when the processing area is rotated in increments of 90 degrees clockwise in step S807, the values of X, Y indicating the positions or ranges included in the reference processing area are converted from TOP to RIGHT, RIGHT to BOTTOM, BOTTOM to LEFT, and LEFT to TOP in accordance with a 90-degree rotation. Furthermore, the value of X and the value of Y are switched each time the processing area is rotated by 90 degrees. The converted processing area information is stored in the RAM 303 and the like, and the reference processing area stored in the processing area management unit 406 is not changed.

Furthermore, when the processing area is indicated using a clockwise angle, the angle of rotation is subtracted from the angle indicating the processing area.

In step S806, the placement method determination unit 404 rotates the placement direction 703 defined for the manufacturing apparatus identified by the target operation step, which is included in the placement specifications, by the sum of the angles stored in the RAM 303 in step S807, i.e., the sum of the angles by which the reference processing area defined per operation step type has been rotated, and determines the post-rotation orientation as the placement method. For example, the placement direction 703 obtained in step S803 in the case of the three-side trimming device A is an upward arrow. This arrow is rotated in the rotational direction that was stored in the RAM 303 in step S807 by the sum of the angles of rotation, and the resultant arrow is determined as the placement method. It should be noted that, in place of the arrow, an angle indicating the direction of the arrow may be stored as the placement direction 703. In step S810, the placement method output unit 408 outputs, i.e., prints the arrow indicating the placement method, i.e., the placement direction determined in step S809 in the output area designated by the processing step 506, and ends the processing. Thereafter, the worker sets a stack of sheets in the manufacturing apparatus such that the direction in which the stack of sheets is inserted into the manufacturing apparatus (i.e., the reference direction of the apparatus) matches the direction of the arrow indicating the placement direction (i.e., the direction indicating the reference edge). It should be noted that, in addition to the arrow, a message may be printed on the output area so as to provide more detailed information to the worker.

<Specific Examples of Processes>

The following describes the processes of steps S805 to S808 with reference to FIGS. 9A to 9C, using an example of the case of an operation step of three-side trimming, especially the case in which the manufacturing apparatus 701 is the three-side trimming device A. An icon 901 of FIG. 9A shows a reference processing area defined per operation step type, and in terms of a specific data structure, it is the reference processing area 604 for three-side trimming. An arrow 902 indicates the placement direction 703 for the three-side trimming device A included in the placement specifications. In terms of a specific data structure, it is an upward arrow indicated by the placement direction included in the placement specifications in which the manufacturing apparatus 701 is the three-side trimming device A. A placement side 903 is an example of the placement side 704 per manufacturing apparatus. In terms of a specific data structure, it is "either front or back" indicated by the placement side included in the placement specifications in which the manufacturing apparatus 701 is the three-side trimming device A. A processing area 905 of FIG. 9B is an example of the processing area designated by the processing step 506 of three-side trimming included in the product specifications. This processing area 905 includes three areas. The first area is positioned at the right end in the width direction, and is in a range from the top end to the bottom end in the vertical direction. The second area is in a range from the left end to the right end in the width direction, and is positioned at the bottom end in the vertical direction. The third area is positioned at the left end in the width direction, and is in a range from the top end to the bottom end in the vertical direction. In this case, a sum of these three areas serves as the processing area, and an icon 904 illustrates a bleed represented by this processing area on a sheet. FIG. 9C illustrates the processes of steps S805 to S808. In the first-time execution of step S805, the processing area 905, which is an example of the processing area included in the product specifications, does not match the reference processing area 604 defined per operation step type, and therefore the processing proceeds to step S807. In step S807, the reference processing area 604 defined per operation step type, which corresponds to the icon 902, is rotated by 90 degrees clockwise. An icon 906 shows the reference processing area that has been thus rotated. At this time, a processing area 908 is yielded by rotating the processing area information 604, which is data corresponding to the icon 901, by 90 degrees clockwise. The clockwise rotational direction and the sum of the angles of rotation, i.e., 90 degrees are stored in the RAM 303, and the processing proceeds to step S808. In S808, the sum of the angles of rotation is smaller than 360 degrees, and therefore the processing returns to step S805. In the second execution of step S805, the processing area 905 included in the product specifications is compared with the post-rotation reference processing area 908 yielded by rotating the reference processing area 604 by 90 degrees. Specifically, the areas included in the processing area 905 are compared with the areas included in the processing area 908. In the present case, the areas included in the processing area 905 entirety match the areas included in the post-rotation reference processing area 908; accordingly, it is determined that these processing areas match, and the processing proceeds to step S806. In step S806, the arrow 902 indicating the placement direction is rotated in the rotational direction stored in the RAM 303 by the sum of angles stored in the same. As a result, the orientation of an arrow 907 is achieved. This orientation is determined and printed as the placement method, and the processing is ended. Although it is assumed here that the placement side per manufacturing apparatus, which is front/back information, is used without getting changed, the placement side may be changed. The placement side is changed when, for example, "front" is printed on the first page and "back" is printed on the last page in case binding (textblock).

As described above, in a printing assistance system according to the first embodiment, in order for a worker to set printed sheets in a manufacturing apparatus, the direction in which the printed sheets are set in the manufacturing apparatus can be printed in an area that cannot be seen due to its hidden state or is lost as a result of trimming in a final product.

Printing a correct setting direction in the foregoing manner makes it possible to prevent the worker from setting the sheets in a wrong direction by mistake. Furthermore, sheets can be correctly set in various manufacturing apparatuses even by a worker who does not remember their respective sheet setting directions.

In order to have the printed material, i.e., the output from the printing device 104 processed in serial with a plurality of processing devices, it is sufficient to print marks indicating the placement directions such that each mark is printed in a pair with identification information of a corresponding processing device. In the example of FIG. 5, a case binding apparatus and a three-side trimming apparatus A are used as post-processing apparatuses. In this case, together with the name of each post-processing apparatus, an arrow indicating a setting direction in that post-processing apparatus is printed in a manner that clarifies association with the name. The association can be indicated by, for example, coloring.

Second Embodiment

In the first embodiment, a placement method can be determined from a processing area included in the product specifications and a processing area associated with the placement specifications, and the determined placement method can be output to an output area for a processing device. In a second embodiment, the placement method can be output for a printing device instead of a processing device.

<Data Structure of Product Specifications and Data Structure of Output Area in Second Embodiment>

A data structure of the product specifications according to the present embodiment will now be described with reference to FIG. 10. A data structure of the product specifications according to the first embodiment has been described with reference to FIG. 5. Below, only the differences between the first and second embodiments will be described.

Figure 5:
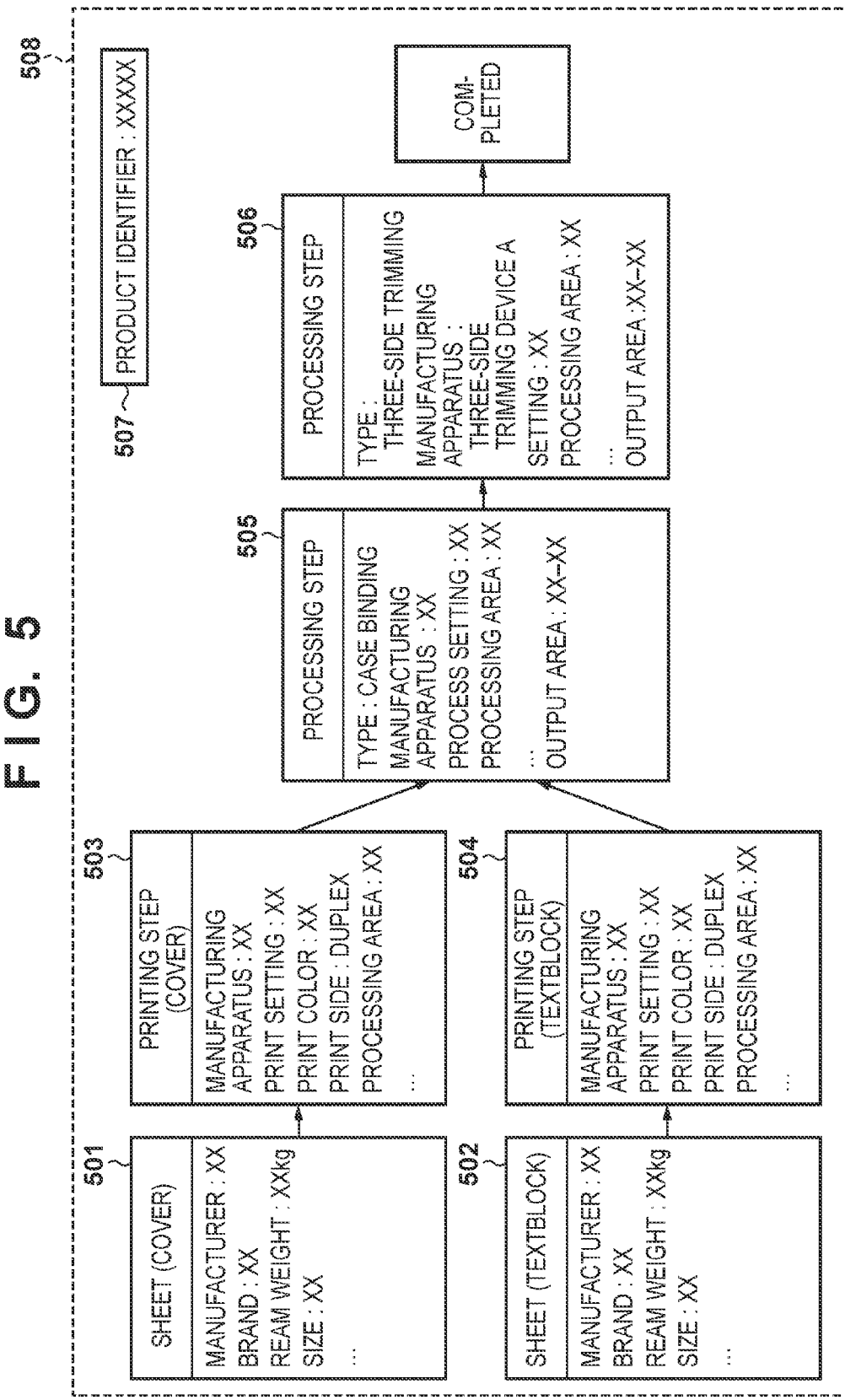
FIG. 5 shows an example of data representing the product specifications.
Figure 10:
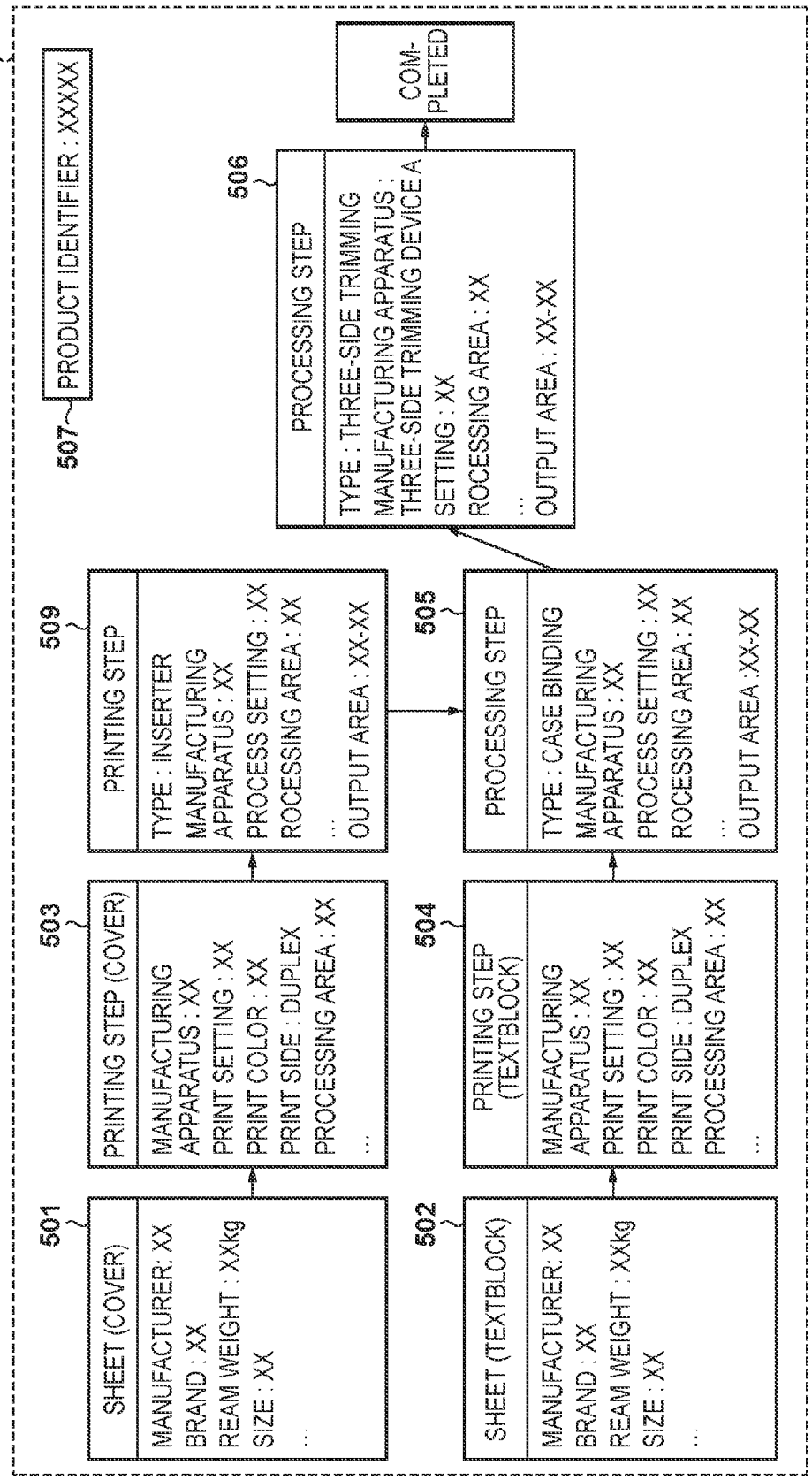
FIG. 10 shows an example of data representing the product specifications according to a second embodiment.

FIG. 10 is the same as FIG. 5 except for an operation step 509 of FIG. 10. A type of the operation step 509 is an inserter, which is an operation step for setting printed sheets in a printing device. For example, when case binding is performed in in-line processing connecting between a printing device and a processing device, a cover is set in the inserter.

As no area becomes invisible as a result of the operation step 509, an output area is set within a processing area that becomes invisible as a result of trimming and the like in a subsequent post-processing step, i.e., a processing step 505 or a processing step 506.

The second embodiment can be realized with the structure according to the first embodiment shown in FIG. 4. A description of the flow is also omitted as the flow is similar to the processing shown in FIG. 8. As described above, a printing assistance system according to the second embodiment can achieve the effects similar to the effects achieved by the printing assistance system according to the first embodiment, even if an operation step involves a printing device. That is to say, as a correct setting direction is printed, it is possible to prevent a worker from setting sheets in a wrong direction by mistake. Furthermore, sheets can be correctly set in various manufacturing apparatuses even by a worker who does not remember their respective sheet setting directions.

In order to additionally provide a processing area with a direction in which sheets are set in a three-side trimming device A, the apparatuses that perform the operation steps and the placement directions are printed, in association, in an output area set within the processing area using different colors as described in the first embodiment; as a result, the setting directions in the operation step 509 and the operation step 506 can be shown.

Third Embodiment

In the first and second embodiments, manufacturing apparatuses used in various operation steps are preset in the product specifications. In a third embodiment, for example, when a manufacturing apparatus set in the product specifications cannot be used due to a trouble and the like, a placement method can be output to an output area in accordance with the placement specifications of an alternative manufacturing apparatus that has been selected for use by a worker.

<Structure of Placement Method Determination Assistance Program of Third Embodiment>

Figure 11:
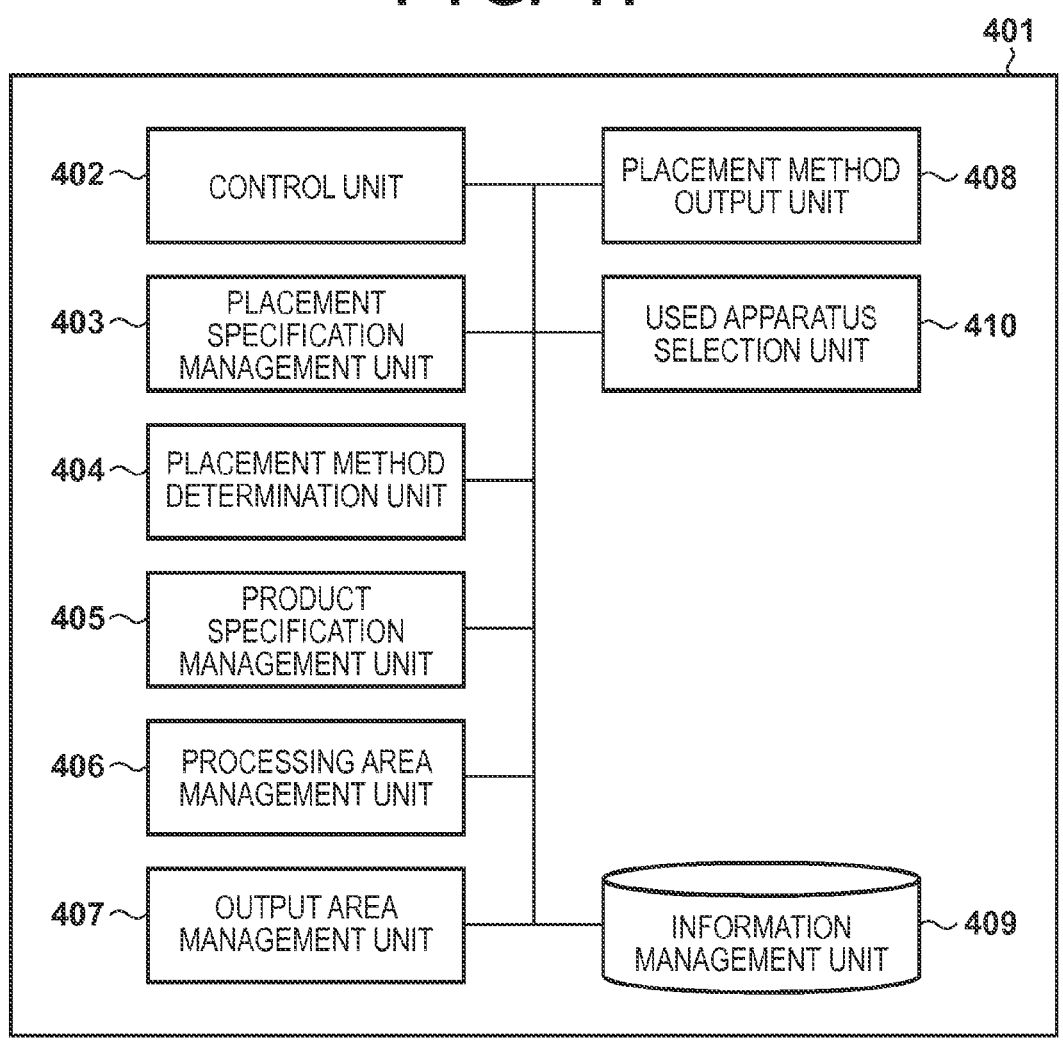
FIG. 11 is a block diagram showing a structure of a program according to a third embodiment.

FIG. 11 is a block diagram showing a structure of a placement method determination assistance program 401 according to the present embodiment. The structure of the placement method determination assistance program according to the first embodiment has been described with reference to FIG. 4. Below, only the differences from FIG. 4 will be described. Upon receiving an instruction from a control unit 402, a used apparatus selection unit 410 reflects an alternative manufacturing apparatus selected by a worker in the product specifications.

<Flowchart in Third Embodiment>

Figure 12:
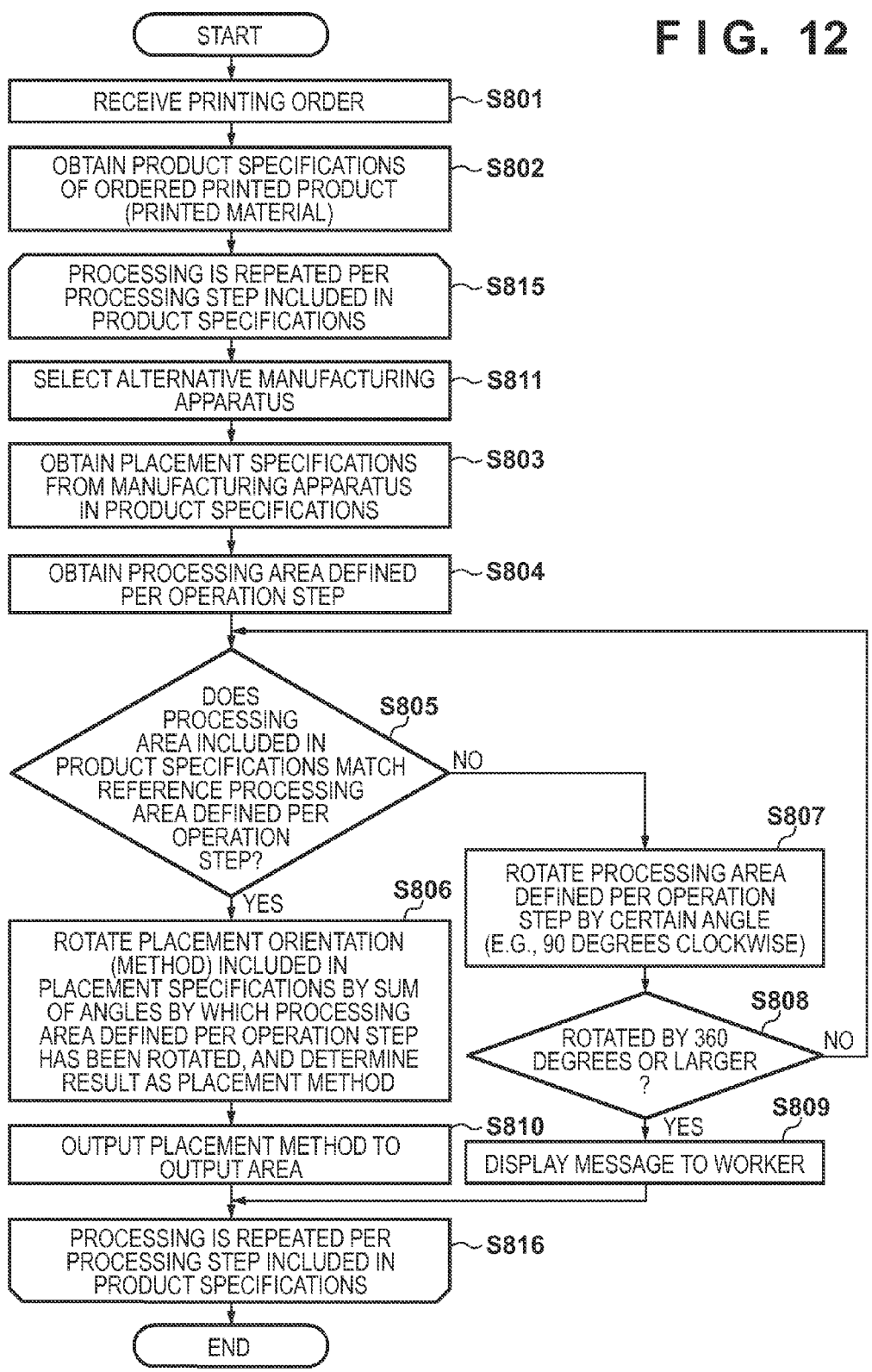
FIG. 12 is a flowchart for determining and outputting a placement method according to the third embodiment.

The following describes a processing flow for determining and outputting a placement method according to the present embodiment with reference to FIGS. 12 and 17. The processing flow for determining and outputting the placement method according to the first embodiment has been described with reference to FIG. 8. Below, only the differences from FIG. 8 will be described. In step S811, in response to an instruction from the worker, the used apparatus selection unit 410 selects a manufacturing apparatus that serves as an alternative to a manufacturing apparatus included in the product specifications obtained in step S802, temporarily replaces data in the RAM 303, and uses the post-replacement data in processes from step S803. That is to say, in step S803, the placement specifications of the alternative manufacturing apparatus are obtained. A data structure of the product specifications according to the present embodiment is similar to that according to the first embodiment, and therefore a description thereof is omitted. A description is now given of a screen that allows the worker to select an alternative apparatus to use with reference to FIG. 17. A user interface (UI) 1701 is an example of a screen that is called up in selection of an alternative apparatus to use with the placement method determination assistance program 401. A replacement target apparatus list 1702 is a list of manufacturing apparatuses included in the product specifications obtained in step S802, and a manufacturing apparatus to be replaced is selected therefrom. An alternative apparatus list 1703 is a list of usable manufacturing apparatuses that have been stored in advance in an information management unit 409 by an administrator, and an alternative manufacturing apparatus is selected therefrom. When a cancel button 1704 is pressed, this screen is closed without performing anything. When an OK button 1705 is pressed, the manufacturing apparatuses included in the product specifications obtained in step S802 are temporarily replaced in the RAM 303 on the basis of the manufacturing apparatuses selected from the lists 1702 and 1703. Each selectable row of the replacement target apparatus list 1702 may be displayed in the form of an icon graphically showing a corresponding operation step and manufacturing apparatus for the sake of selection. Similarly, each selectable row of the alternative apparatus list 1703 may be displayed in the form of an icon graphically showing a corresponding manufacturing apparatus for the sake of selection.

As described above, in a printing assistance system according to the third embodiment, the effects similar to the effects achieved by the printing assistance system according to the first embodiment can be achieved also when operations are performed using an alternative manufacturing apparatus with different placement specifications. That is to say, as a correct setting direction is printed, it is possible to prevent a worker from setting sheets in a wrong direction by mistake. Furthermore, sheets can be correctly set in various manufacturing apparatuses even by a worker who does not remember their respective sheet setting directions.

Fourth Embodiment

In the first to third embodiments, a placement method is output to an output area so as to inform a worker of the placement method. In a fourth embodiment, even if there is no place to print the placement method, an instruction about the placement method is issued by generating a written operation instruction describing the placement method instead.

<Structure of Placement Method Determination Assistance Program of Fourth Embodiment>

Figure 13:
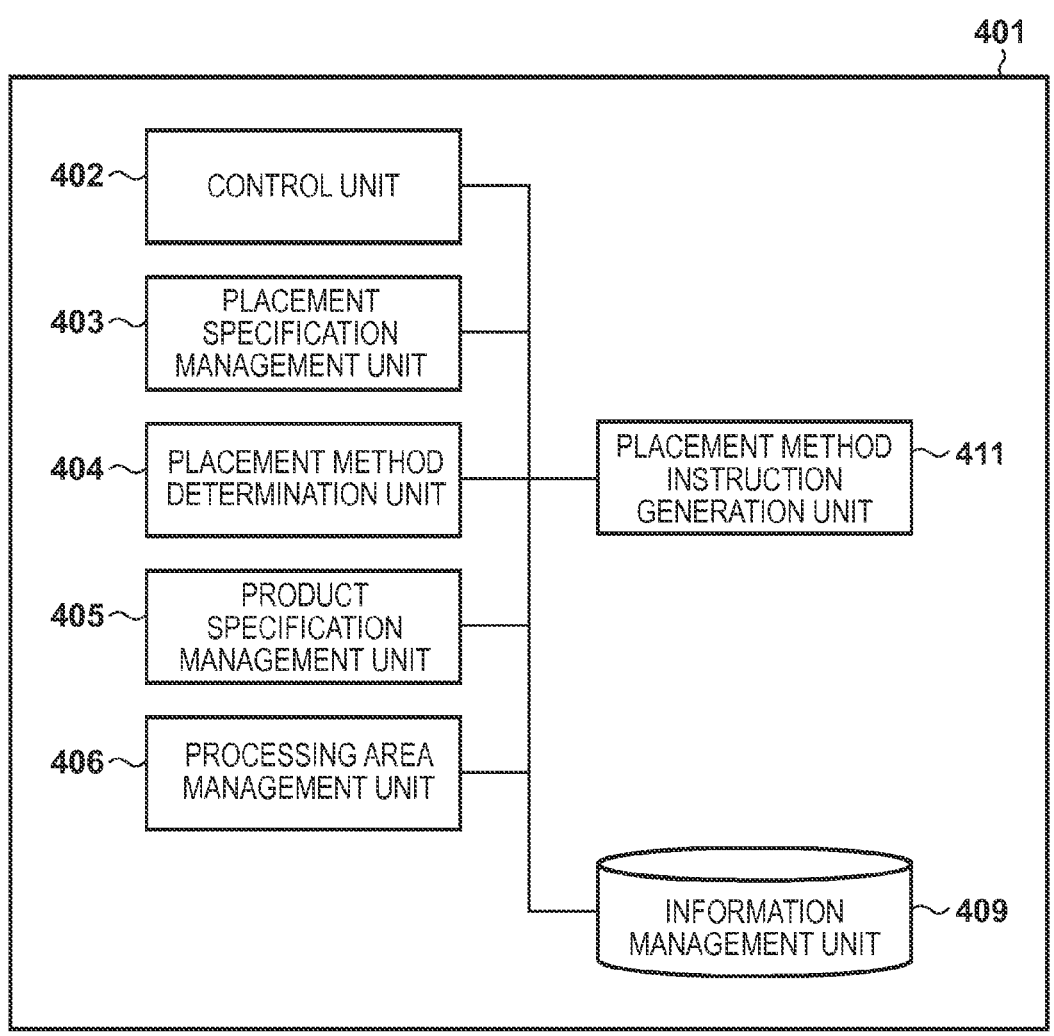
FIG. 13 is a block diagram showing a structure of a program according to a fourth embodiment.
Figure 18:
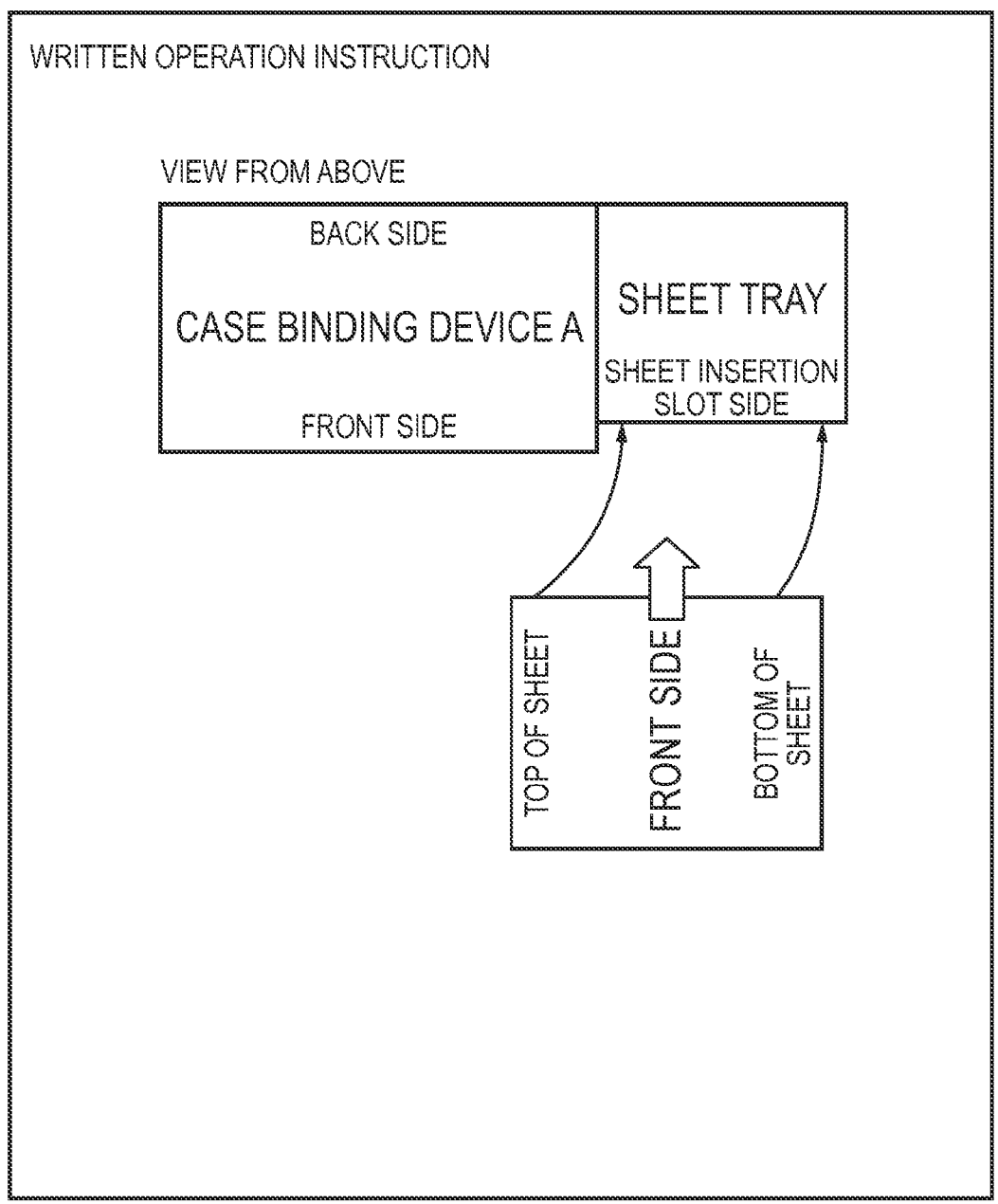
FIG. 18 shows an example of a written operation instruction according to the fourth embodiment.

FIG. 13 is a block diagram showing a structure of a placement method determination assistance program 401 according to the present embodiment. The structure of the placement method determination assistance program according to the first embodiment has been described with reference to FIG. 4. Below, only the differences from FIG. 4 will be described. The output area management unit 407 and the placement method output unit 408 of FIG. 4 are omitted from the structure of FIG. 13 as they are not required in the present embodiment; however, they may be included in the present embodiment. Upon receiving an instruction from a control unit 402, a placement method instruction generation unit 411 generates a written operation instruction describing a placement method. FIG. 18 shows an example of the written operation instruction. An administrator stores, in advance, information of a template of the written operation instruction, illustrations related to various manufacturing apparatuses, the positions of sheet insertion slots of the various manufacturing apparatuses, and the like in an information management unit 409. The written operation instruction can be generated by arranging a placement direction determined in step S806 to oppose a sheet insertion slot and further adding a placement side based on such information.

<Flowchart in Fourth Embodiment>

Figure 14:
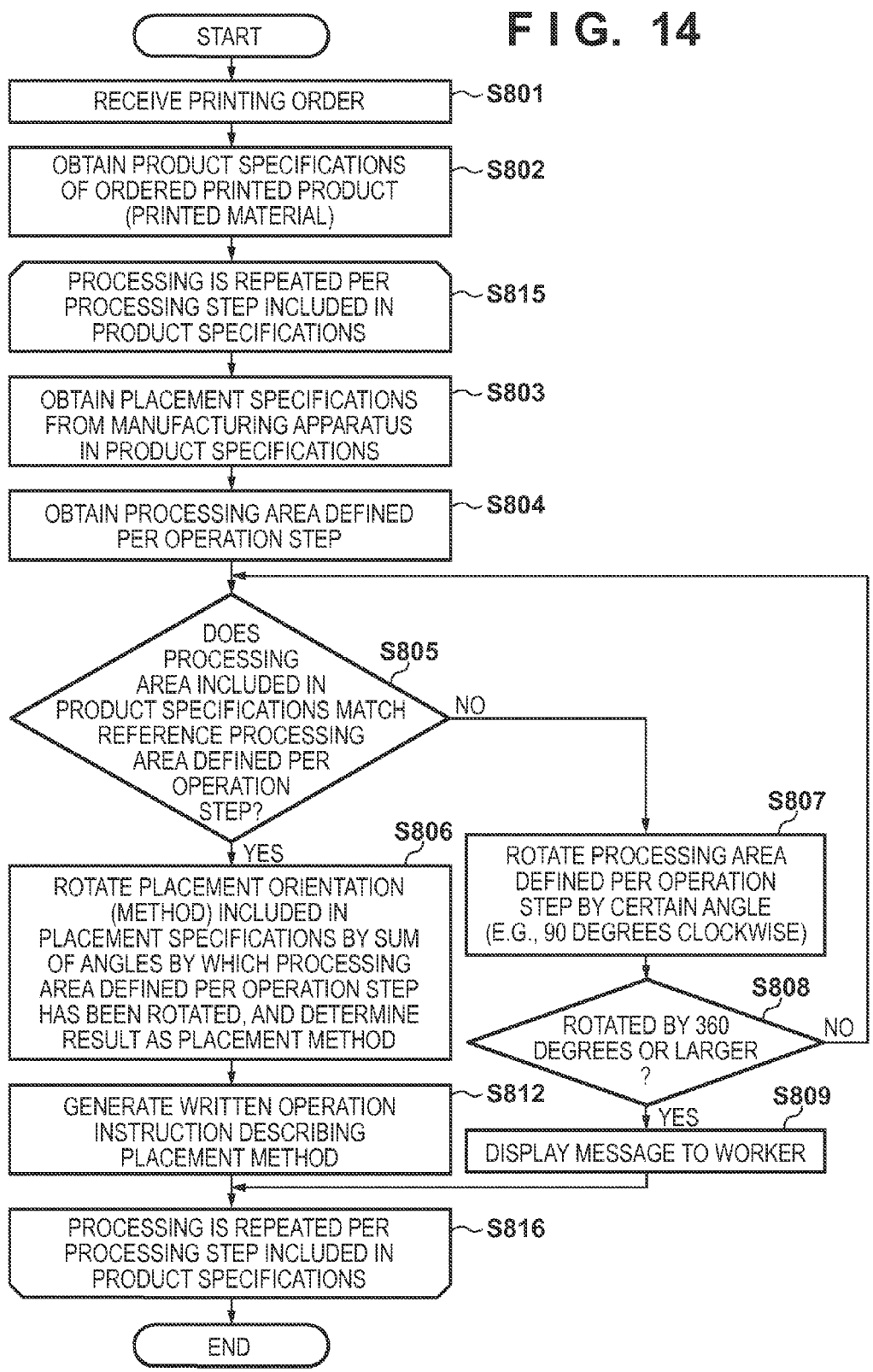
FIG. 14 is a flowchart for determining and outputting a placement method according to the fourth embodiment.

The following describes a processing flow for determining a placement method and generating a written operation instruction in the present embodiment with reference to FIG. 14. The processing flow for determining and outputting the placement method according to the first embodiment has been described with reference to FIG. 8. Below, only the differences from FIG. 8 will be described. The process of step S812 of FIG. 14 is executed in place of step S810 of FIG. 8. In step S812, the placement method instruction generation unit 411 generates a written operation instruction describing a placement method determined in step S806.

As described above, even if there is no place to output a placement method, a printing assistance system according to the fourth embodiment can achieve the effects similar to the effects achieved by the printing assistance system according to the first embodiment by generating a written operation instruction describing the placement method. That is to say, as a correct setting direction is described in the written operation instruction, it is possible to prevent a worker from setting sheets in a wrong direction by mistake. Furthermore, sheets can be correctly set in various manufacturing apparatuses even by a worker who does not remember their respective sheet setting directions.

Fifth Embodiment

In the first to fourth embodiments, a placement method is printed on a printed product or a written operation instruction. A fifth embodiment is related to a method for issuing an instruction about a placement method by displaying the placement method superimposed over a printed product on a display terminal, instead of printing the placement method.

<Structure of Placement Method Determination Assistance Program of Fifth Embodiment>

Figure 15:
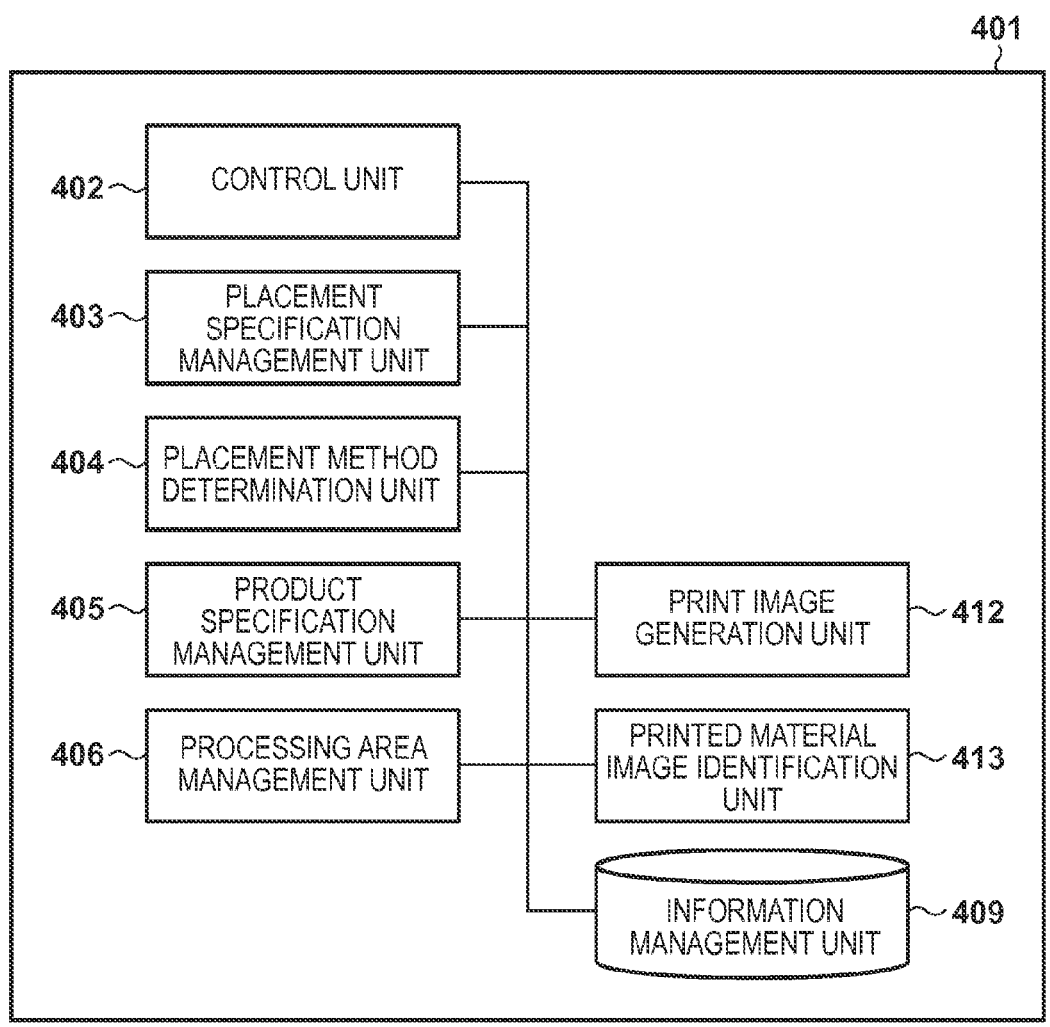
FIG. 15 is a block diagram showing a structure of a program according to a fifth embodiment.

FIG. 15 is a block diagram showing a structure of a placement method determination assistance program 401 according to the present embodiment. The structure of the placement method determination assistance program according to the first embodiment has been described with reference to FIG. 4. Below, only the differences from FIG. 4 will be described. The output area management unit 407 and the placement method output unit 408 of FIG. 4 are omitted from the structure of FIG. 15 as they are not required in the present embodiment; however, they may be included in the present embodiment. Upon receiving an instruction from a control unit 402, a print image generation unit 412 generates a print image that is used by a later-described printed material image identification unit 413 in identification of a printed product. Upon receiving an instruction from the control unit 402, the printed material image identification unit 413 executes the following processing. First, the printed material image identification unit 413 receives, as a printed material image, an image that has been captured and transmitted by a terminal with an image capturing function, a communication function, and a display function, such as a smartphone, a tablet terminal, and an eyeglass-shaped wearable computer (eyeglass terminal). The printed material image identification unit 413 identifies the printed material image based on the print image, superimposes information indicating a placement method, and returns the result of the superimposition to the terminal. FIG. 19A shows an example of display of an arrow representing a placement method superimposed over a printed material image that has been captured with a smartphone. At this time, an arrow 1902 representing the placement method is displayed by being superimposed over the printed material image on a screen 1901 of the smartphone. FIG. 19B shows an example of display of an arrow representing a placement method superimposed over a printed material image that has been captured with an eyeglass terminal. An eyeglass terminal 1903 has a monitor display unit 1904, which is arranged on the eyeglass terminal 1903 in a fixed position. Similarly to the case of the screen 1901, the arrow 1902 representing the placement method is displayed by being superimposed over the printed material image within the monitor display unit 1904. FIG. 19C shows another example of display of a placement method superimposed over a printed material image that has been captured with an eyeglass terminal. FIG. 19C is different from FIG. 19B in that, instead of superimposing the placement method over the printed material image, the placement method is superimposed over a printed product that is being viewed in reality. In processing pertaining to this case, the placement method is superimposed over the printed material image, but the printed material image itself is not displayed. In the present example, an arrow representing the placement method is displayed on an eyeglass terminal 1905 such that the arrow is superimposed over a printed product 1906 that is being viewed through the eyeglass terminal. This scheme is applicable not only to images but also to video. In the latter case, the printed material image identification unit receives video that has been captured and transmitted by a terminal, superimposes a placement method over a printed material image, and returns the result of the superimposition to the terminal. In this case, the printed material is identified from an image that has been captured with an image capturing unit of an eyeglass-shaped terminal, generates a mark, such as an arrow, indicating a placement direction in accordance with the position, orientation, and range of the printed material, and displays the generated mark.

<Flowchart in Fifth Embodiment>

Figure 16A:
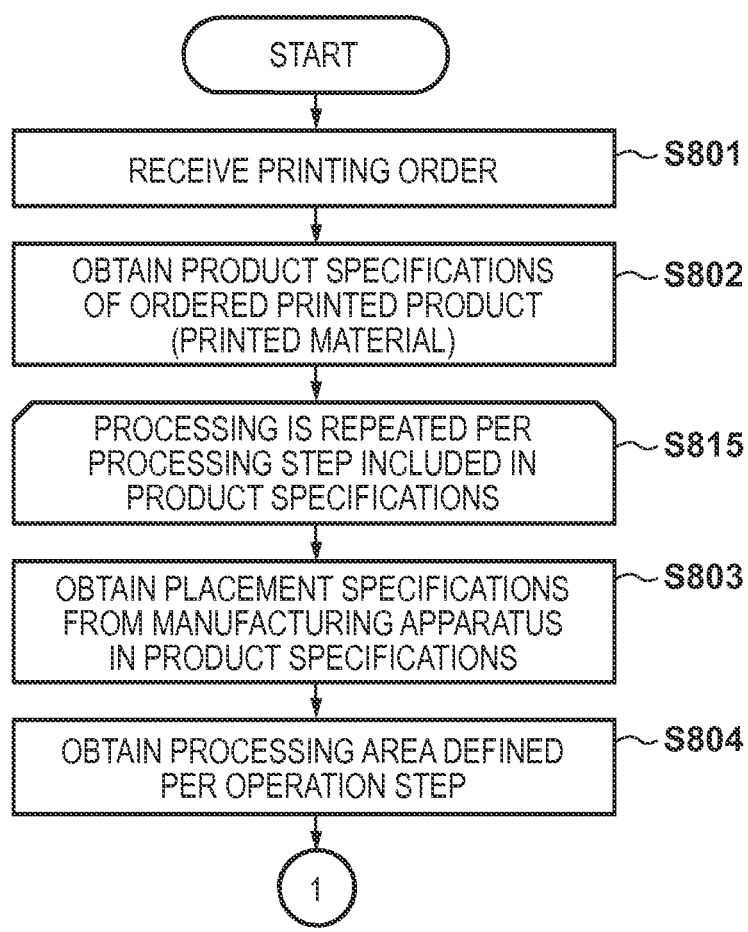

The following describes a processing flow for determining and outputting a placement method according to the present embodiment with reference to FIGS. 16A and 16B.

The processing flow for determining and outputting the placement method according to the first embodiment has been described with reference to FIG. 8. Below, only the differences from FIG. 8 will be described. The process of step S810 of FIG. 8 is not executed. In step S813, the print image generation unit 412 generates a print image from printing data, and stores the generated print image in a RAM 303 or an external storage apparatus 305. The print image is generated by rasterizing the printing data. At this time, the size is reduced by compression. The printing data may be used as-is as the print image. Next, a printed material image obtained by capturing an image of a printed product with the smartphone of FIG. 19A or the eyeglass terminal of FIG. 19B is transmitted to the printed material image identification unit. In step S814, the printed material image identification unit 413 receives the printed material image and identifies the received printed material image as the printing data base on the print image generated in step S813; following this identification, the printed material image is returned to the terminal with information indicating a placement method superimposed thereover. At the terminal, the printed material image is displayed with the placement method superimposed thereover, thereby informing a worker of the placement method. In the case of the terminal of FIG. 19C that identifies a printed material image in real time, a placement method is displayed in real time by constantly transmitting captured printed material images to the printed material image identification unit and constantly receiving printed material images over which information indicating the placement method is superimposed.

As described above, a printing assistance system according to the fifth embodiment can achieve the effects similar to the effects achieved by the printing assistance system of the first embodiment by informing a display device of a placement method without printing the placement method. That is to say, as a correct setting direction is displayed on a display device, it is possible to prevent a worker from setting sheets in a wrong direction by mistake. Furthermore, sheets can be correctly set in various manufacturing apparatuses even by a worker who does not remember their respective sheet setting directions.

The present invention is not limited to the above-described embodiments, and various forms of modification (including any organic combination of the embodiments) are possible based on the concept of the present invention and should not be excluded from the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-097112, filed May 8, 2014 which is hereby incorporated by reference herein in its entirety.

What is claimed is:

1. A printing system for producing printed material by executing, based on specification information defining at least one processing steps, the processing step using at least one corresponding processing apparatus, the printing system comprising:
    a storage unit that stores direction information indicating a reference placement direction of a sheet on the processing apparatus, the sheet being to be processed by the processing apparatus and processing area information indicating a processing area to be processed by the processing apparatus;
    a determination unit that determines a placement direction of the sheet to be placed on the processing apparatus using the reference placement direction indicated by the direction information for matching a processing area specified by the specification information for matching a processing area specified by the specification information with the processing area to be processed by the processing apparatus, the processing area being indicated by the processing area information; and
    an output unit that outputs the placement direction determined by the determination unit.

2. The printing system according to claim 1, wherein the output unit prints the placement direction on the sheet in an area that becomes invisible as a result of the processing steps.

3. The printing system according to claim 1, wherein the output unit prints the placement direction on the sheet in an area that is trimmed off in a trimming step included among the processing steps.

4. The printing system according to claim 1, wherein the output unit prints a written operation instruction describing the placement direction.

5. The printing system according to claim 1, wherein the output unit transmits the placement direction to a terminal provided with a display unit.

6. The printing system according to claim 1, wherein the determination unit rotates the processing area and the reference placement direction in increments of a predetermined angle based on the direction information and the processing area information, and when the rotated processing area matches the processing area specified by the specification information, determines the placement direction at that time as a placement direction of the sheet to be placed on the processing apparatus.

7. The printing system according to claim 6, wherein the predetermined angle is 90 degrees.

8. The printing system according to claim 1, wherein when the specification information specifies serial performance of the at least one processing step, the output unit associates the at least one processing apparatus with a corresponding placement direction of the sheet, and outputs the at least one processing apparatus and the corresponding placement direction of the sheet associated with each other.

9. The printing system according to claim 1, further comprising
a select unit that allows a worker to select the at least one processing apparatus.

10. The printing system according to claim 1, wherein the storage unit stores, for each of a plurality of processing apparatus, the direction information indicating the reference placement direction of a sheet on the processing apparatus, the sheet being to be processed by the processing apparatus and the processing area information indicating the processing area to be processed by the processing apparatus.

11. A non-transitory computer-readable medium storing a program for causing a computer to execute a printing method for producing printed material by executing, based on specification information defining at least one processing step, the processing step using at least one corresponding processing apparatus, the method comprising:
storing direction information indicating a reference placement direction of a sheet on the processing apparatus, the sheet being to be processed by the processing apparatus and processing area information indicating a processing area to be processed by the processing apparatus;
determining a placement direction of the sheet to be placed on the processing apparatus using the reference placement direction indicated by the direction information for matching a processing area specified by the specification information with the processing area to be processed by the processing apparatus, the processing area being indicated by the processing area information; and
outputting the placement direction determined by the determination unit.

12. A printing assistance apparatus for producing printed material by executing, based on specification information defining at least one processing step, the processing step using at least one corresponding processing apparatus, the printing assistance apparatus comprising:
a storage unit that stores direction information including information indicating a reference placement direction of a sheet on the processing apparatus, the sheet being to be processed by the processing apparatus and processing area information indicating a processing area to be processed by the processing apparatus;
a determination unit that determines a placement direction of the sheet to be placed on the processing apparatus using the reference placement direction indicated by the direction information for matching a processing area specified by the specification information for matching a processing area specified by the specification information with the processing area to be processed by the processing apparatus, the processing area being indicated by the processing area information; and
an output unit that outputs the placement direction determined by the determination unit.

13. A printing assistance method for producing printed material by executing, based on specification information defining at least one processing step, the processing step using at least one corresponding processing apparatus, the printing assistance method comprising:
a storage step of storing direction information including information indicating a reference placement direction of a sheet on the processing apparatus, the sheet being to be processed by the processing apparatus and processing area information indicating a processing area to be processed by the processing apparatus;
a determination step of determining a placement direction of the sheet to be placed on the processing apparatus using the reference placement direction indicated by the direction information for matching a processing area specified by the specification information for matching a processing area specified by the specification information with the processing area to be processed by the processing apparatus, the processing area being indicated by the processing area information; and
an output step of outputting the placement direction determined in the determination step.

* * * * *